US009472058B2

(12) United States Patent
Hornik et al.

(10) Patent No.: US 9,472,058 B2
(45) Date of Patent: Oct. 18, 2016

(54) SYSTEMS, METHODS, AND DEVICES FOR PLAYING WAGERING GAMES WITH SYMBOL-DRIVEN EXPECTED VALUE ENHANCEMENTS AND ELIMINATIONS

(71) Applicant: WMS Gaming Inc., Waukegan, IL (US)

(72) Inventors: Jeremy M. Hornik, Chicago, IL (US); Patrick M. Dixon, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

(21) Appl. No.: 14/728,617

(22) Filed: Jun. 2, 2015

(65) Prior Publication Data

US 2015/0262454 A1 Sep. 17, 2015

Related U.S. Application Data

(63) Continuation of application No. 13/570,407, filed on Aug. 9, 2012, now Pat. No. 9,076,283.

(60) Provisional application No. 61/541,335, filed on Sep. 30, 2011.

(51) Int. Cl.
*G06F 17/00* (2006.01)
*G06F 19/00* (2011.01)
(Continued)

(52) U.S. Cl.
CPC ........... *G07F 17/3267* (2013.01); *G07F 17/32* (2013.01); *G07F 17/34* (2013.01); *G07F 17/3244* (2013.01); *G07F 17/3255* (2013.01)

(58) Field of Classification Search
CPC .................................................. G07F 17/3244
See application file for complete search history.

(56) References Cited

U.S. PATENT DOCUMENTS 4,342,454 A 8/1982 Baer et al. ...................... 273/85
4,575,622 A 3/1986 Pellegrini ..................... 235/382
(Continued)

FOREIGN PATENT DOCUMENTS

DE 4200254 8/1993 ............ G07F 17/32
DE 4236968 5/1994 ............ G07F 17/32
(Continued)

OTHER PUBLICATIONS

Chapter 12.5: Expected Value. An Addison-Wesley product. Pearson Education, Inc., pp. 708-713 (2004).

*Primary Examiner* — Steven J Hylinski
(74) *Attorney, Agent, or Firm* — Nixon Peabody LLP

(57) ABSTRACT

Gaming devices, gaming systems, methods of conducting wagering games, and computer programs for executing wagering games are disclosed. A gaming system for conducting a wagering game includes an input device, a display device, a processor, and a memory device. The memory device stores instructions which cause the processor to operate with the display device to: randomly determine an outcome of the wagering game; display symbols indicative of the wagering-game outcome; determine if the displayed symbols include to an expected-value (EV) enhancement symbol combination or an EV-elimination symbol combination, the EV-enhancement and EV-elimination symbol combinations both including a common symbol arranged in a common manner; activate, responsive to the displayed symbols including the EV-enhancement symbol combination, an EV-increasing opportunity that modifies a wagering-game parameter thereby increasing the EV of the wagering game; and deactivate, responsive to the displayed symbol-combination corresponding to the EV-elimination symbol combination, one or more EV-increasing opportunities.

14 Claims, 15 Drawing Sheets

(51) Int. Cl.
*G07F 17/32* (2006.01)
*G07F 17/34* (2006.01)

(56) References Cited

U.S. PATENT DOCUMENTS 4,752,068 A 6/1988 Endo ............................ 273/1 E
4,764,666 A 8/1988 Bergeron ...................... 235/380
4,858,930 A 8/1989 Sato ................................ 273/85
4,882,473 A 11/1989 Bergeron et al. ............. 235/380
4,948,138 A 8/1990 Pease et al. .................. 273/138
5,014,982 A 5/1991 Okada et al. ................. 273/435
5,018,736 A 5/1991 Pearson et al. ............... 273/439
5,123,649 A * 6/1992 Tiberio ............... G07F 17/3244 273/143 R
5,179,517 A 1/1993 Sarbin et al. ................. 364/410
5,265,874 A 11/1993 Dickinson et al. ........... 273/138
5,292,127 A 3/1994 Kelly et al. ............... 273/138 R
5,321,241 A 6/1994 Craine .......................... 235/380
5,370,306 A 12/1994 Schulze et al. ............... 273/138
5,370,399 A 12/1994 Liverance ..................... 273/434
5,393,057 A 2/1995 Marnell .......................... 273/85
5,429,361 A 7/1995 Raven et al. ................. 273/138
5,470,079 A 11/1995 LeStrange et al. ........... 273/138
5,533,727 A 7/1996 DeMar ............................ 463/23
5,547,202 A 8/1996 Tsumura ......................... 463/29
5,551,692 A 9/1996 Pettit et al. ............... 273/143 R
5,575,474 A 11/1996 Rossides ......................... 463/26
5,580,053 A 12/1996 Crouch ........................... 463/20
5,580,309 A 12/1996 Piechowiak et al. ........... 463/16
5,586,766 A 12/1996 Forte et al. ................... 273/309
5,586,936 A 12/1996 Bennett et al. ................. 463/25
5,609,525 A 3/1997 Ohno et al. ..................... 463/43
5,655,961 A 8/1997 Acres et al. .................... 463/27
5,674,128 A 10/1997 Holch et al. .................... 463/42
5,702,304 A 12/1997 Acres et al. .................... 463/29
5,741,183 A 4/1998 Acres et al. .................... 463/42
5,743,523 A 4/1998 Kelly et al. ................ 273/138.1
5,743,800 A 4/1998 Huard et al. .................... 463/26
5,752,882 A 5/1998 Acres et al. .................... 463/42
5,761,647 A 6/1998 Boushy ........................... 705/10
5,770,533 A 6/1998 Franchi ........................... 463/42
5,816,918 A 10/1998 Kelly et al. ..................... 463/16
5,820,459 A 10/1998 Acres et al. .................... 463/25
5,833,537 A 11/1998 Barrie ............................. 463/21
5,833,538 A 11/1998 Weiss .............................. 463/21
5,833,540 A 11/1998 Miodunski et al. ............ 463/42
5,836,817 A 11/1998 Acres et al. .................... 463/26
5,882,258 A 3/1999 Kelly et al. ..................... 463/11
5,902,983 A 5/1999 Crevelt et al. ................ 235/380
5,919,091 A 7/1999 Bell et al. ....................... 463/25
5,931,467 A 8/1999 Kamille ........................ 273/139
5,957,775 A 9/1999 Cherry ............................ 463/16
5,983,196 A 11/1999 Wendkos ........................ 705/14
5,997,401 A 12/1999 Crawford ........................ 463/20
6,004,211 A 12/1999 Brenner et al. ................. 463/40
6,007,426 A 12/1999 Kelly et al. ..................... 463/16
6,009,412 A 12/1999 Storey ............................. 705/14
6,012,045 A 1/2000 Barzilai et al. ................. 705/37
6,012,983 A 1/2000 Walker et al. .................. 463/20
6,015,344 A 1/2000 Kelly et al. ..................... 463/16
6,048,269 A 4/2000 Burns et al. .................... 463/25
6,061,660 A 5/2000 Eggleston et al. .............. 705/14
6,068,552 A 5/2000 Walker et al. .................. 463/21
6,068,553 A 5/2000 Parker ............................. 463/27
6,077,163 A 6/2000 Walker et al. .................. 463/20
6,110,041 A 8/2000 Walker et al. .................. 463/20
6,113,098 A 9/2000 Adams .......................... 273/143
6,113,493 A 9/2000 Walker et al. .................. 463/25
6,162,122 A 12/2000 Acres et al. .................... 463/29
6,165,071 A 12/2000 Weiss .............................. 463/24
6,178,408 B1 1/2001 Copple et al. .................. 705/14
6,179,710 B1 1/2001 Sawyer et al. .................. 463/16
6,193,608 B1 2/2001 Walker et al. .................. 463/25
6,203,430 B1 3/2001 Walker et al. .................. 463/20
6,227,972 B1 5/2001 Walker et al. .................. 463/25
6,231,445 B1 5/2001 Acres .............................. 463/42
6,234,896 B1 5/2001 Walker et al. .................. 463/16
6,234,897 B1 5/2001 Frohm ............................ 463/20
6,244,958 B1 6/2001 Acres .............................. 463/26
6,251,013 B1 6/2001 Bennett ........................... 463/13
6,251,014 B1 6/2001 Stockdale et al. .............. 463/16
6,254,481 B1 7/2001 Jaffe ............................... 463/20
6,254,483 B1 7/2001 Acres .............................. 463/26
6,273,820 B1 8/2001 Haste, III ........................ 463/40
6,280,326 B1 8/2001 Saunders ........................ 463/25
6,280,328 B1 8/2001 Holch et al. .................... 463/42
6,293,866 B1 9/2001 Walker et al. .................. 463/20
6,302,790 B1 10/2001 Brossard ......................... 463/20
6,302,793 B1 10/2001 Fertitta, III et al. ............ 463/25
6,311,976 B1 11/2001 Yoseloff et al. ............. 273/138
6,312,334 B1 11/2001 Yoseloff .......................... 705/14
6,319,127 B1 11/2001 Walker et al. .................. 463/26
6,334,613 B1 1/2002 Yoseloff .......................... 463/21
6,340,331 B1 1/2002 Saunders et al. ............... 463/20
6,364,765 B1 4/2002 Walker et al. ................ 273/143
6,364,766 B1 4/2002 Anderson et al. .............. 463/16
6,365,765 B1 4/2002 Baldwin et al. .............. 556/440
6,371,852 B1 4/2002 Acres .............................. 463/25
6,394,900 B1 5/2002 McGlone et al. .............. 463/29
6,394,907 B1 5/2002 Rowe .............................. 463/24
6,398,650 B1 6/2002 Horigami et al. .............. 705/14
6,431,983 B2 8/2002 Acres .............................. 463/25
6,506,117 B2 1/2003 DeMar et al. .................. 463/20
6,506,118 B1 1/2003 Baerlocher et al. ............ 463/25
6,517,433 B2 2/2003 Loose et al. .................... 463/20
6,533,273 B2 3/2003 Cole et al. .................... 273/138
6,540,609 B1 4/2003 Paige .............................. 463/25
6,592,456 B2 7/2003 Walker et al. .................. 463/20
6,592,457 B1 7/2003 Frohm et al. ................... 463/25
6,605,001 B1 8/2003 Tarantino ........................ 705/14
6,609,975 B1 8/2003 Sawyer et al. .................. 463/26
6,612,575 B1 9/2003 Cole et al. .................... 273/138
6,663,487 B1 12/2003 Ladner ............................ 463/13
6,663,489 B2 12/2003 Baerlocher ...................... 463/20
6,682,421 B1 1/2004 Rowe et al. .................... 463/25
6,722,981 B2 4/2004 Kaminkow et al. ............ 463/25
6,722,985 B2 4/2004 Criss-Puszkiewicz et al. .............................. 463/29
6,745,236 B1 6/2004 Hawkins et al. ............. 709/218
6,752,312 B1 6/2004 Chamberlain et al. ....... 235/375
6,758,757 B2 7/2004 Luciano, Jr. et al. .......... 463/43
6,776,713 B2 8/2004 Gauselmann .................. 463/16
6,780,111 B2 8/2004 Cannon et al. ................. 463/25
6,800,027 B2 10/2004 Giobbi et al. .................. 463/21
6,811,486 B1 11/2004 Luciano, Jr. .................... 463/24
6,840,860 B1 1/2005 Okuniewicz .................... 463/35
6,923,721 B2 8/2005 Luciano et al. ................ 463/24
7,182,690 B2 2/2007 Giobbi et al. .................. 463/24
7,628,693 B2 12/2009 Thomas .......................... 463/20
7,682,244 B1 3/2010 Luciano, Jr. et al. .......... 463/25
7,704,137 B2 4/2010 Englman ......................... 463/16
7,749,074 B2 7/2010 Cole et al. ...................... 463/21
7,841,935 B2 * 11/2010 Gauselmann ........... G07F 17/32 463/16
8,172,661 B1 * 5/2012 Hein ................... G07F 17/3244 463/16
8,272,944 B2 9/2012 Englman et al. ............... 463/21
2001/0024971 A1 9/2001 Brossard ......................... 463/30
2001/0046893 A1 11/2001 Giobbi et al. .................. 463/24
2001/0048193 A1 12/2001 Yoseloff et al. ........... 273/138.1
2002/0028708 A1 3/2002 Busch et al. .................... 463/42
2002/0039919 A1 4/2002 Joshi et al. ..................... 463/20
2002/0074726 A1 6/2002 Yoseloff et al. ............. 273/274
2002/0077170 A1 6/2002 Johnson et al. ................ 463/16
2002/0077173 A1 6/2002 Luciano et al. ................ 463/25
2002/0077174 A1 6/2002 Luciano et al. ................ 463/25
2002/0093136 A1 7/2002 Moody ......................... 273/139
2002/0094871 A1 7/2002 Luciano, Jr. et al. .......... 463/43
2002/0107065 A1 8/2002 Rowe .............................. 463/20
2002/0151349 A1 10/2002 Joshi ............................... 463/20
2002/0196342 A1 12/2002 Walker et al. ................ 348/157
2003/0013515 A1 1/2003 Rowe et al. .................... 463/25
2003/0013531 A1 1/2003 Rowe et al. .................... 463/42
2003/0036422 A1 2/2003 Baerlocher et al. ............ 463/20

(56) References Cited

U.S. PATENT DOCUMENTS

| | | | | |
|---|---|---|---|---|
| 2003/0036427 | A1 | 2/2003 | Brandstetter et al. | 463/29 |
| 2003/0045354 | A1 | 3/2003 | Giobbi | 463/40 |
| 2003/0064794 | A1 | 4/2003 | Mead et al. | 463/25 |
| 2003/0078101 | A1 | 4/2003 | Schneider et al. | 463/42 |
| 2003/0100362 | A1 | 5/2003 | Horniak et al. | 463/25 |
| 2003/0106769 | A1 | 6/2003 | Weiss | 194/201 |
| 2003/0114219 | A1 | 6/2003 | McClintic | 463/25 |
| 2003/0119579 | A1 | 6/2003 | Walker et al. | 463/20 |
| 2003/0157978 | A1 | 8/2003 | Englman | 463/16 |
| 2003/0157979 | A1 | 8/2003 | Cannon et al. | 463/16 |
| 2003/0195024 | A1 | 10/2003 | Slattery | 463/9 |
| 2003/0207713 | A1* | 11/2003 | Taylor | G07F 17/3244 463/25 |
| 2003/0211881 | A1 | 11/2003 | Walker et al. | 463/20 |
| 2004/0038731 | A1 | 2/2004 | Englman | 463/25 |
| 2004/0053680 | A1 | 3/2004 | Schultz | 463/20 |
| 2004/0121838 | A1 | 6/2004 | Hughs-Baird | 463/25 |
| 2004/0142742 | A1 | 7/2004 | Schneider et al. | 463/25 |
| 2004/0198481 | A1* | 10/2004 | Herrington | G07F 17/32 463/13 |
| 2004/0209662 | A1 | 10/2004 | Wadleigh | 463/16 |
| 2005/0003886 | A1 | 1/2005 | Englman et al. | 463/25 |
| 2005/0049039 | A1 | 3/2005 | Webb | 463/25 |
| 2005/0159207 | A1 | 7/2005 | Thomas | 463/20 |
| 2006/0030392 | A1 | 2/2006 | Rodgers | 463/16 |
| 2006/0068893 | A1 | 3/2006 | Jaffe et al. | 463/20 |
| 2006/0079316 | A1 | 4/2006 | Flemming et al. | 463/25 |
| 2006/0079317 | A1 | 4/2006 | Flemming et al. | 463/25 |
| 2006/0084495 | A1 | 4/2006 | Jaffe et al. | 463/20 |
| 2006/0084496 | A1 | 4/2006 | Jaffe et al. | 463/20 |
| 2006/0089194 | A1 | 4/2006 | Joshi et al. | 463/25 |
| 2007/0021183 | A1 | 1/2007 | Fiden et al. | 463/17 |
| 2007/0254734 | A1 | 11/2007 | Gilmore et al. | 463/20 |
| 2007/0259706 | A1 | 11/2007 | Anderson et al. | 463/16 |
| 2007/0259713 | A1 | 11/2007 | Fiden et al. | 463/25 |
| 2007/0265060 | A1 | 11/2007 | Hornik et al. | 463/20 |
| 2007/0298856 | A1 | 12/2007 | Gilmore et al. | 463/16 |
| 2008/0113770 | A1 | 5/2008 | Gelber et al. | 463/25 |
| 2008/0248867 | A1 | 10/2008 | Englman et al. | 463/25 |
| 2009/0209317 | A1 | 8/2009 | Gomez | 463/20 |
| 2009/0291752 | A1 | 11/2009 | Anderson et al. | 463/25 |
| 2010/0120506 | A1 | 5/2010 | Davis | 463/20 |
| 2011/0183746 | A1 | 7/2011 | Englman et al. | 463/25 |

FOREIGN PATENT DOCUMENTS

| | | | |
|---|---|---|---|
| EP | 0360613 | 3/1990 | G07F 17/34 |
| EP | 0431723 | 6/1991 | A63F 9/22 |
| ES | 2028694 | 7/1992 | G07F 17/34 |
| GB | 2241098 | 8/1991 | G07F 7/08 |
| GB | 2332151 | 6/1999 | A63F 9/22 |
| JP | 60-106680 | 7/1985 | A63F 9/22 |
| JP | 02-265584 | 10/1990 | A63F 7/02 |
| JP | 04-009177 | 1/1992 | A63F 9/22 |
| JP | 04-079977 | 3/1992 | A63F 9/00 |
| JP | 05-277233 | 10/1993 | A63F 7/02 |
| JP | 07-024128 | 1/1995 | A63F 7/02 |
| JP | 07-155453 | 6/1995 | A63F 7/02 |
| JP | 09-276500 | 10/1997 | A63F 7/02 |
| JP | 10-066777 | 3/1998 | A63F 7/02 |
| JP | 10-146423 | 6/1998 | A63F 7/02 |
| JP | 11-309246 | 11/1999 | A63F 7/02 |
| WO | 95/22811 | 8/1995 | G07F 17/32 |
| WO | 97/12338 | 4/1997 | G06F 161/00 |
| WO | 99/29381 | 6/1999 | A63F 7/00 |
| WO | 02/21467 | 3/2002 | G07F 17/32 |
| WO | 2005/082480 | 9/2005 | A63F 13/00 |
| WO | 2006/002241 | 1/2006 | A63F 13/00 |
| WO | 2006/004831 | 1/2006 | A63F 13/00 |
| WO | 2006/004832 | 1/2006 | A63F 13/00 |
| WO | 2006/005073 | 1/2006 | G07F 17/32 |
| WO | 2006/017036 | 2/2006 | A63F 13/00 |
| WO | 2006/017067 | 2/2006 | A63F 13/00 |
| WO | 2006/017068 | 2/2006 | A63F 13/00 |
| WO | 2006/020811 | 2/2006 | A63F 9/24 |
| WO | 2006/026250 | 3/2006 | G07F 17/32 |
| WO | 2006/044252 | 4/2006 | A63F 9/24 |
| WO | 2007/089410 | 8/2007 | A63F 9/24 |
| WO | 2007/103054 | 9/2007 | G06F 19/00 |
| WO | 2008/048634 | 4/2008 | A63F 13/06 |

* cited by examiner

SYSTEMS, METHODS, AND DEVICES FOR PLAYING WAGERING GAMES WITH SYMBOL-DRIVEN EXPECTED VALUE ENHANCEMENTS AND ELIMINATIONS

CLAIM OF PRIORITY AND CROSS-REFERENCE TO RELATED APPLICATIONS

This application is a Continuation of U.S. patent application Ser. No. 13/570,407, which was filed on Aug. 9, 2012, now allowed, which claims the benefit of and priority to U.S. Provisional Patent Application No. 61/541,335, which was filed on Sep. 30, 2011, both of which are incorporated herein by reference in their respective entireties.

COPYRIGHT

A portion of the disclosure of this patent document contains materials which are subject to copyright protection. The copyright owner has no objection to the facsimile reproduction by anyone of the patent disclosure, as it appears in the U.S. Patent and Trademark Office patent files or records, but otherwise reserves all copyright rights whatsoever.

TECHNICAL FIELD

The present disclosure relates generally to wagering games, as well as wagering game terminals and gaming systems. More particularly, the present disclosure relates to systems, methods, and devices for playing wagering games with symbol-driven features.

BACKGROUND

Gaming machines, such as slot machines, video poker machines, video black-jack machines, and the like, have been a cornerstone of the gaming industry for several years. Generally, the popularity of such machines with players is dependent on the likelihood (or perceived likelihood) of winning money at the machine and the intrinsic entertainment value of the associated wagering game relative to other available gaming options. Where the available gaming options include a number of competing machines and the expectation of winning at each machine is roughly the same (or believed to be the same), players are likely to be attracted to the most entertaining and exciting machines. Shrewd operators therefore strive to employ the most entertaining and exciting machines, features, and enhancements available because such machines attract frequent play and hence increase profitability to the operator.

One concept that has been successfully employed to enhance the entertainment value of a game is that of a "secondary" or "bonus" game which may be played in conjunction with a "basic" game. The bonus game, which is typically entered upon the occurrence of a selected event or outcome of the basic game, may comprise any type of game, either similar to or completely different from the basic game. Such a bonus game produces a significantly higher level of player excitement than the basic game because it provides a greater expectation of winning than the basic game.

Another concept that has been employed to enhance player entertainment and achieve player loyalty is the use of progressive games. In the gaming industry, a "progressive" game historically involves collecting coin-in data from participating gaming device(s) (e.g., slot machines), contributing a percentage of that coin-in data to a progressive jackpot amount, and awarding that jackpot amount to a player upon the occurrence of a certain jackpot-won event. A jackpot-won event typically occurs when a "progressive winning position" is achieved at a participating gaming device. If the gaming device is a slot machine, a progressive winning position normally corresponds to alignment of progressive jackpot reel symbols along a certain payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement. Typically, once the progressive jackpot is awarded, the jackpot amount is reset to the predetermined minimum amount.

While some currently available game features provide some enhanced entertainment and excitement, there is a continuing need to develop new features for wagering games to satisfy the ever-changing demands of players and operators. Such new features will further enhance player entertainment and excitement, perpetuate player loyalty, and thus increase game play.

SUMMARY

Aspects of this disclosure are directed towards the accumulation of diverse expected value (EV) game enhancements through play of base games, bonus games, or both. These opportunities are symbol driven from the reels, and the collection of these opportunities alters a player's gaming experience over time. In the same manner that these game enhancements are collected, they can also be eliminated. These opportunities can be any number of enhancements, such as creating new symbol wins, upgrading payouts for a preexisting winning combination, providing extra picks/spins in a triggered bonus game, adding a multiplier on wins or bonus awards, increasing the value or values in a triggered bonus, reducing thresholds for triggering a bonus game, etc. These EV enhancements can affect base-game play, bonus-game play, or any other segment of the game. In essence, aspects of this disclosure are directed to dynamically increasing and decreasing the EV of a wagering game over time based on game-play outcomes.

In some embodiments, once an opportunity is earned, it remains a part of the gaming experience until it is eliminated in a manner similar to the way it was earned. In one embodiment, all collected opportunities are eliminated when an EV-elimination symbol combination appears on the array. In other embodiments, opportunities are eliminated one-by-one, in much the same manner as they are collected. In other embodiments, an EV-elimination symbol combination can work in the exact opposite way as an EV-enhancement symbol combination—i.e., reduce the EV of the wagering game, for example, by downgrading a payout for a preexisting winning combination, reducing the number of spins/picks in a bonus, etc.

According to aspects of the present disclosure, a gaming system for conducting a wagering game is presented. The gaming system includes an input device for receiving a wager to play the wagering game, a display device for displaying outcomes of the wagering game, and a processor connected to the display device. The gaming system also includes at least one memory device. The memory device stores a plurality of instructions which, when executed by at least one processor, cause the processor(s) to operate with the display device to: determine an outcome of the wagering game, the wagering-game outcome being randomly determined from a plurality of outcomes; display a combination of symbols indicative of the wagering-game outcome; determine if the displayed combination of symbols includes an expected-value (EV) enhancement symbol combination or an EV-elimination symbol combination, the EV-enhancement symbol combination and the EV-elimination symbol combination both including a common symbol arranged in a common manner; activate, responsive to the displayed combination of symbols including the EV-enhancement symbol combination, an EV-increasing opportunity which modifies a parameter of the wagering game thereby increasing the expected value of the wagering game; and deactivate, responsive to the displayed combination of symbols including the EV-elimination symbol combination, one or more previously activated EV-increasing opportunities.

According to other aspects of the present disclosure, a gaming system for conducting a wagering game is presented. The gaming system includes at least one input device, at least one display device, and at least one processor. The gaming system also includes at least one memory device that stores a plurality of instructions which, when executed by the at least one processor, cause the at least one processor to operate with the at least one display device and the least one input device to: receive an indication of a wager to play the wagering game; determine an outcome of the base game, the base-game outcome being randomly determined from a plurality of base-game outcomes; display a combination of symbols indicative of the base-game outcome, the combination of symbols being arranged within a symbol array; determine if the displayed combination of symbols includes one of a plurality of expected-value (EV) enhancement symbol combinations or an EV-elimination symbol combination, the EV-enhancement symbol combinations and the EV-elimination symbol combination all including a shared activation symbol arranged at a first location within the symbol array, and each comprising a respective activation symbol arranged at a second location within the symbol array; activate a corresponding EV-increasing opportunity which modifies a respective parameter of the wagering game thereby increasing the overall expected value of the wagering game, the activation being responsive to the displayed combination of symbols including one of the EV-enhancement symbol combinations; and deactivate one or more of the EV-increasing opportunities thereby decreasing the overall expected value of the wagering game, the deactivation being responsive to the displayed combination of symbols including the EV-elimination symbol combination.

According to further aspects of the present disclosure, a computer-implemented method of conducting a wagering game on a gaming device is featured. The method includes: receiving an indication of a wager via one or more input devices; determining, via at least one of one or more processors, an outcome of the wagering game, the outcome being randomly determined from a plurality of wagering-game outcomes; displaying, via one or more display devices, a combination of symbols indicative of the wagering-game outcome; determining, via at least one of the one or more processors, if the displayed combination of symbols includes an expected-value (EV) enhancement symbol combination or an EV-elimination symbol combination, the EV-enhancement symbol combination and the EV-elimination symbol combination both including a shared symbol arranged in a common manner, and each comprising a respective symbol arranged in a similar manner separate from the shared symbol; activating, responsive to the displayed combination of symbols including the EV-enhancement symbol combination, an EV-increasing opportunity which modifies a parameter of the wagering game thereby increasing the expected value of the wagering game; and deactivating, responsive to the displayed combination of symbols including the EV-elimination symbol combination, one or more previously activated EV-increasing opportunities thereby decreasing the expected value of the wagering game.

According to even yet another aspect of the present disclosure, one or more non-transient computer-readable storage media are encoded with instructions for directing a gaming device or a gaming system to perform any of the methods disclosed herein. For instance, a computer program product is disclosed which comprises a non-transient computer-readable medium having an instruction set borne thereby, the instruction set being configured to cause, upon execution by one or more controllers, the acts of: receiving an indication of a wager; determining an outcome of the wagering game, the outcome being randomly determined from a plurality of wagering-game outcomes; directing a display device to display a combination of symbols indicative of the wagering-game outcome; determining if the displayed combination of symbols includes one of a plurality of expected-value (EV) enhancement symbol combinations or an EV-elimination symbol combination, the EV-enhancement symbol combinations and the EV-elimination symbol combination all including a shared symbol arranged in a common manner and each comprising a respective symbol arranged in a similar manner separate from the shared symbol; activating, responsive to the displayed combination of symbols including one of the EV-enhancement symbol combinations, a corresponding EV-increasing opportunities which modifies a respective parameter of the wagering game thereby increasing the expected value of the wagering game; and deactivating, responsive to the displayed combination of symbols including the EV-elimination symbol combination, one or more activated EV-increasing opportunities thereby decreasing the expected value of the wagering game.

The above summary is not intended to represent each embodiment or every aspect of the present disclosure. Rather, the summary merely provides an exemplification of some of the novel features presented herein. The above features and advantages, and other features and advantages of the present disclosure, will be readily apparent from the following detailed description of exemplary embodiments and best modes for carrying out the present invention when taken in connection with the accompanying drawings and the appended claims.

Figure 1A:
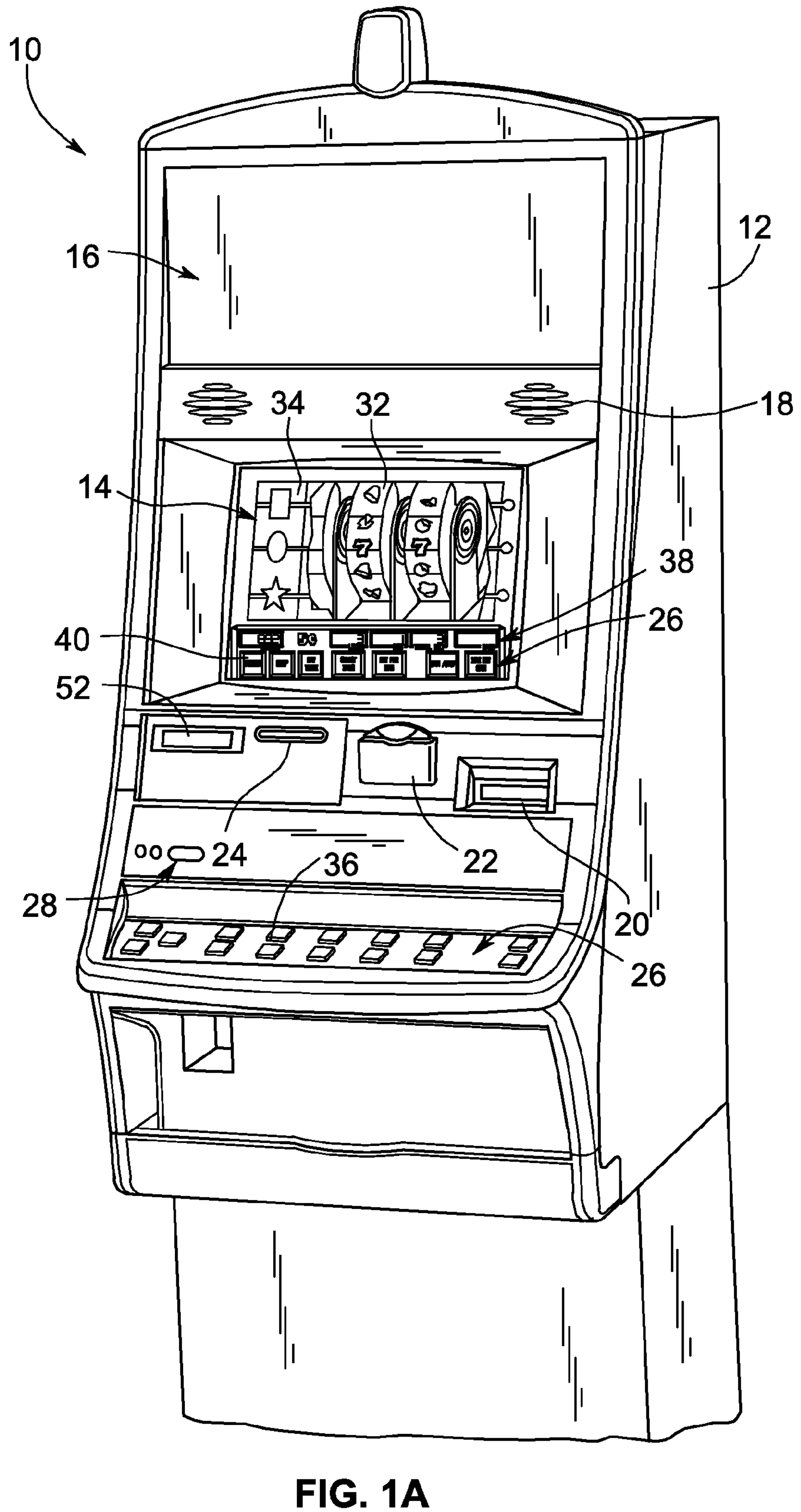
FIG. 1A is a perspective-view illustration of an example of an upright free-standing gaming terminal in accordance with aspects of the present disclosure.

While the aspects of this disclosure are susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there are shown in the drawings and will herein be described in detail representative embodiments with the understanding that the present disclosure is to be considered as an exemplification of the various aspects and principles of the invention, and is not intended to limit the broad aspect of the invention to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present description, unless specifically disclaimed, the singular includes the plural and vice versa; the words "and" and "or" shall be both conjunctive and disjunctive; the word "all" means "any and all;" the word "any" means "any and all;" and the word "including" means "including without limitation."

Referring to FIG. 1A, there is shown a gaming terminal 10 similar to those used in conventional gaming establishments, such as casinos, hotels and cruise ships, and non-conventional gaming establishments, such as airports and restaurants. With regard to the present disclosure, the gaming terminal 10 may be any type of gaming terminal and may have varying structures and methods of operation. For example, in some aspects, the gaming terminal 10 can be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, such as the terminal 100 of FIG. 1B, a portable or handheld device primarily used for gaming, such as is disclosed by way of example in PCT Patent Application No. PCT/US2007/000792 filed Jan. 11, 2007, titled "Handheld Device for Wagering Games," which is incorporated herein by reference in its entirety, a mobile telecommunications device such as a mobile telephone or personal digital assistant (PDA), a counter-top or bar-top gaming terminal, or other personal electronic and computing devices, such as a laptop computer, portable television, MP3 player, entertainment device, etcetera.

The gaming terminal 10 illustrated in FIG. 1A comprises a cabinet or housing 12. For output devices, this embodiment of the gaming terminal 10 includes a primary display area 14 (or "primary display device"), a secondary display area 16 (or "secondary display device"), and one or more audio speakers 18. The primary display area 14 and secondary display area 16 can variously display information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1A includes a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 includes, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1A. The primary display area 14 includes, in relation to many aspects of wagering games conducted on the gaming terminal 10, one or more paylines 30 (see FIG. 3) extending along a portion of the primary display area. In the illustrated embodiment of FIG. 1A, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1A is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and the secondary display area 16 can be rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example and in any combination, a plurality of buttons 36 on a button panel, as shown in FIG. 1A, a mouse, a joy stick, a switch, a microphone, a touch screen 38 mounted over a display (e.g., primary display area 14 or secondary display area 16) having one or more soft touch keys 40, as is also shown in FIG. 1A. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, or to facilitate access to casino services, such as is more fully disclosed, by way of example, in U.S. Patent Publication No. 2003/0045354, published on Mar. 6, 2003, entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 1B:
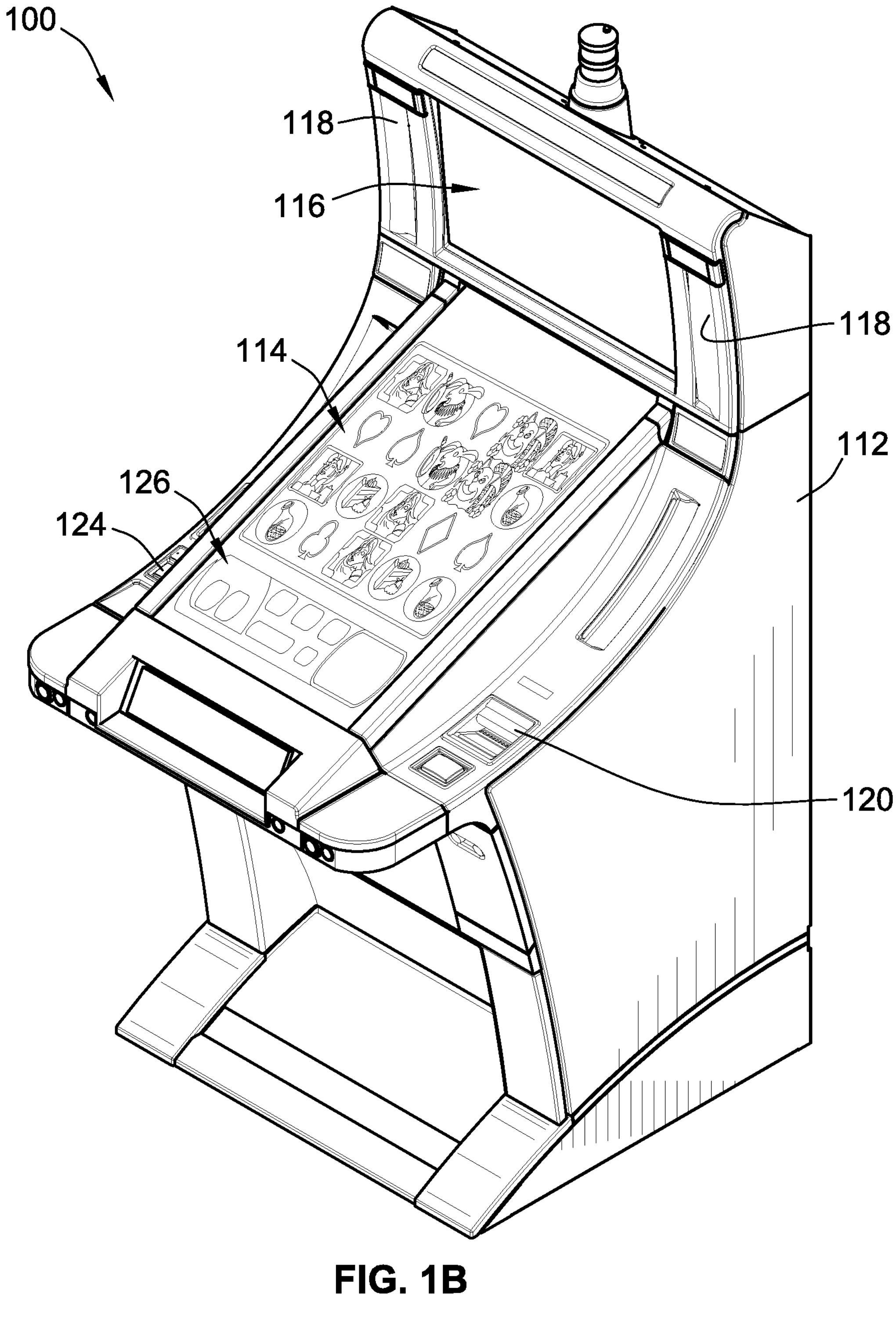
FIG. 1B is a perspective-view illustration of an example of a slant-top free-standing gaming terminal in accordance with aspects of the present disclosure.

Referring now to FIG. 1B, a representative gaming terminal or machine 100 of the "slant-top" type is shown in accord with at least some aspects of the disclosed concepts. Although differing in appearance, the gaming terminal 100 can be similar in function, operation, and connectivity to the gaming terminal 10 discussed above with respect to FIG. 1A. For instance, the gaming terminal 100 may be an electromechanical gaming terminal configured, for example, to play mechanical slots, or it may be an electronic gaming terminal configured, for example, to play a video casino game, such as keno, poker, slots, blackjack, roulette, or a combination of both. Markedly, the gaming terminal 100 of FIG. 1B is purely representative in nature, and presented solely for explanatory purposes. As such, the aspects of the present disclosure are in no way limited to the terminal configurations shown in the drawings.

The illustrated gaming terminal 100 comprises a cabinet 112 for housing and, in some configurations, supporting a variety of operational and peripheral componentry (e.g., CPU 42, memory 44, external systems interface 58, etc.). For output devices, the gaming terminal 100 includes a primary display area (or "first display device") 114, an optional secondary display area (or "second display device") 116, and one or more audio speakers 118. These display devices 114, 116 can take on any of the possible types, include any of the optional features, and can operate in any manner described above with respect to the various displays of the gaming machine 10 of FIG. 1A. For input devices, the gaming terminal 100 may include, in any combination, a bill-receiving and validating device 120, a coin acceptor, one or more information readers 124, one or more player-input devices 126, and one or more player-accessible ports (e.g., an audio output jack for headphones, a video headset jack, an internet cable jack, a wireless transmitter/receiver, etc.). While these typical components found in the gaming terminal 100 are described above, it should be understood that numerous additional/alternative peripheral devices and other elements may exist and may be used in any number of combinations to create various forms of a gaming terminal.

Figure 2:
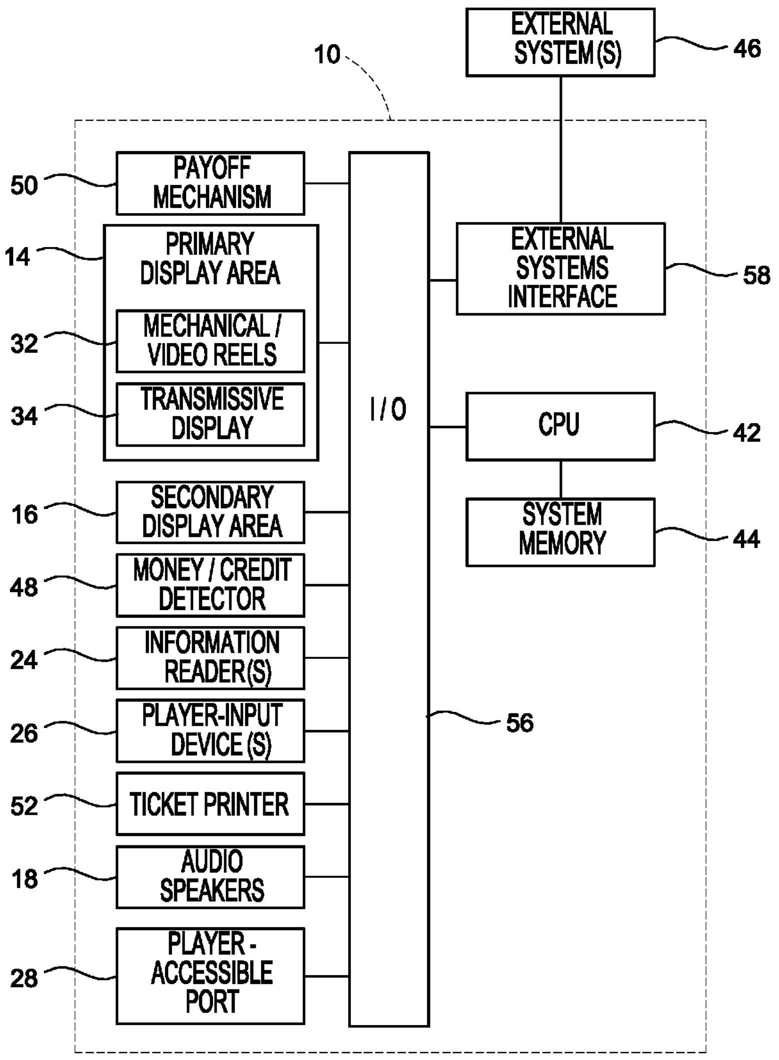
FIG. 2 is a schematic diagram of an exemplary gaming system according to aspects of the present disclosure.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, or firmware disposed in or disposed outside of the gaming terminal 10 that is configured to communicate with or control the transfer of data between the gaming terminal 10 and a bus, another computer, processor, or device or a service or a network. The controller 42 comprises one or more controllers or processors and such one or more controllers or processors need not be disposed proximal to one another and may be located in different devices or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering-game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal to the controller 42 that money, credits, or other form of a wager has been input via one or more value-input devices, such as the bill validator 20 or coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device(s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs are typically paid out in coins, currency bills, electronic credits, and combinations thereof, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+front-side bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10 bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
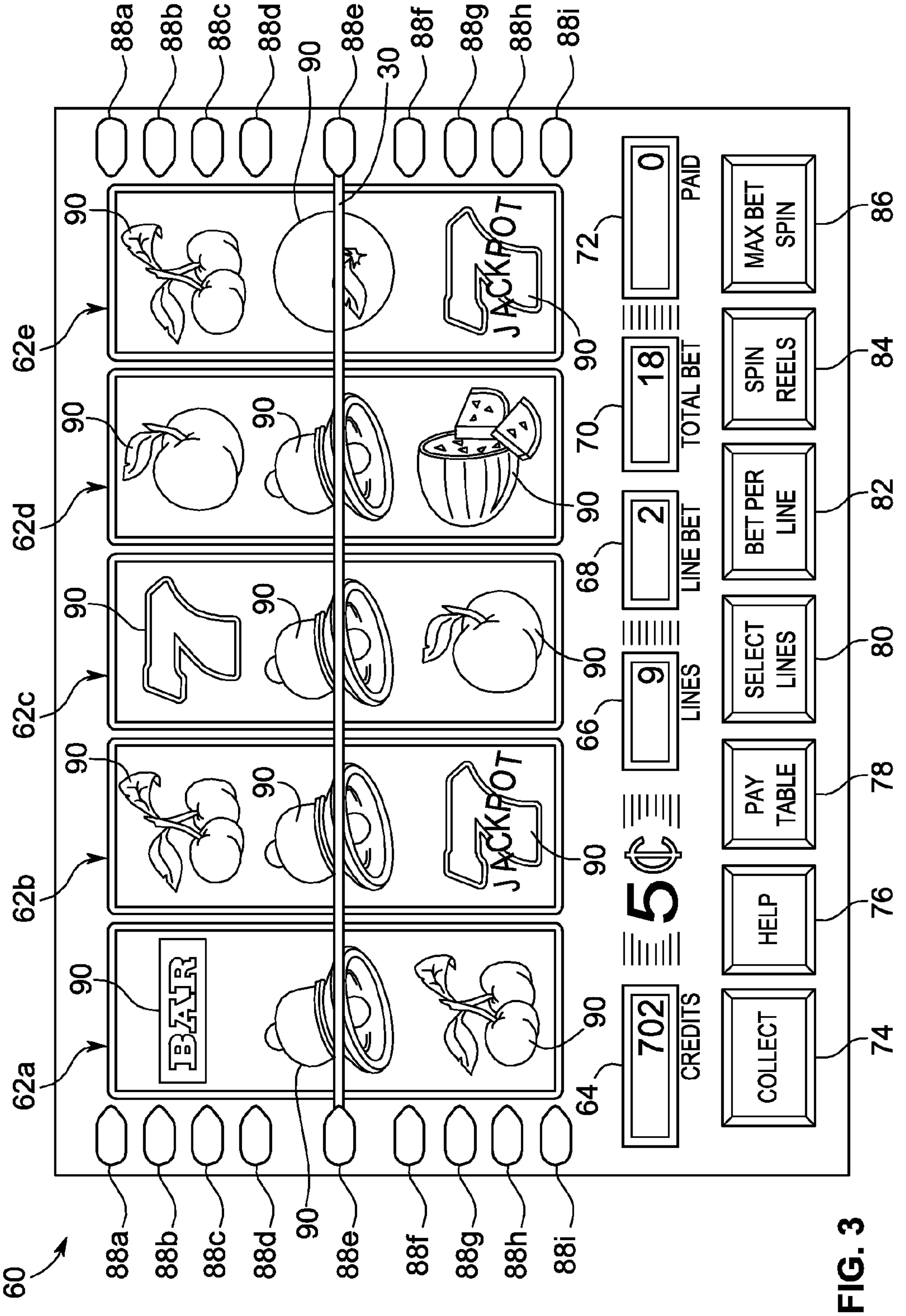
FIG. 3 is a screen shot of a basic-game screen from an exemplary wagering game that can be played, for example, on the gaming terminals of FIG. 1A or 1B or the gaming system of FIG. 2.

Referring now to FIG. 3, an image of a basic-game screen 60 adapted to be displayed on the primary display area 14 is illustrated, according to one embodiment of the present disclosure. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accordance with various methods of conducting a wagering game on a gaming system in accord with the present concepts, the wagering game includes a game sequence in which a player makes a wager, such as through the money/credit detector 48, touch screen 38 soft key, button panel, or the like, and a wagering-game outcome is associated with the wager. The wagering-game outcome is then revealed to the player in due course following initiation of the wagering game. The method comprises the acts of conducting the wagering game using a gaming apparatus, such as the gaming terminal 10 depicted in FIG. 1A, following receipt of an input from the player to initiate the wagering game. The gaming terminal 10 then communicates the wagering-game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14, other display device, or other output device (e.g., speakers, lights, communication device, etc.), alone or in combination, to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a-e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present disclosure does not require them and can be used on gaming terminals having more, less, or different player inputs.

As shown in the example of FIG. 3, paylines 30 extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present disclosure. Additionally, though an embodiment with five reels is shown in FIG. 3, different embodiments of the gaming terminal 10 comprise a greater or lesser number of reels in accordance with the present disclosure.

Figure 4:
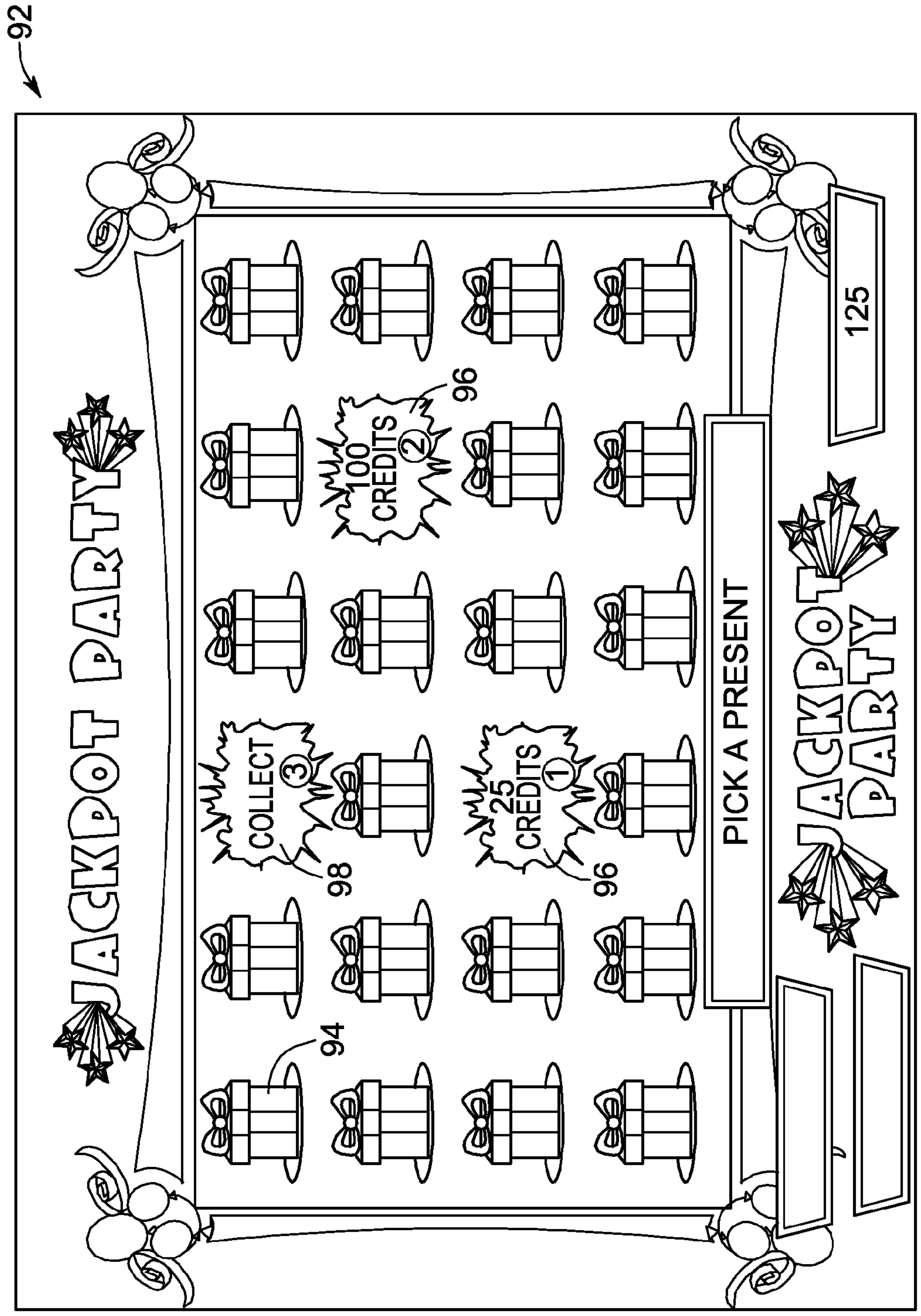
FIG. 4 is a screen shot of a bonus-game screen from an exemplary wagering game that can be played, for example, on the gaming terminals of FIG. 1A or 1B or the gaming system of FIG. 2.

Turning now to FIG. 4, an example of a bonus game to a basic wagering game is illustrated. A bonus-game screen 92 includes an array of markers 94 located in a plurality of columns and rows. The bonus game is entered upon the occurrence of a triggering event, such as the occurrence of a start-bonus game outcome (e.g., symbol trigger, mystery trigger, time-based trigger, etc.) in or during the basic wagering game. Alternatively, any bonus game described herein is able to be deployed as a stand-alone wagering game independent of a basic wagering game.

In the illustrated bonus game of FIG. 4, a player selects, one at a time, from the array of markers 94 to reveal an associated bonus-game outcome. According to one embodiment of this bonus game, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated and the accumulated award outcomes 96 are provided to the player.

Figure 5:
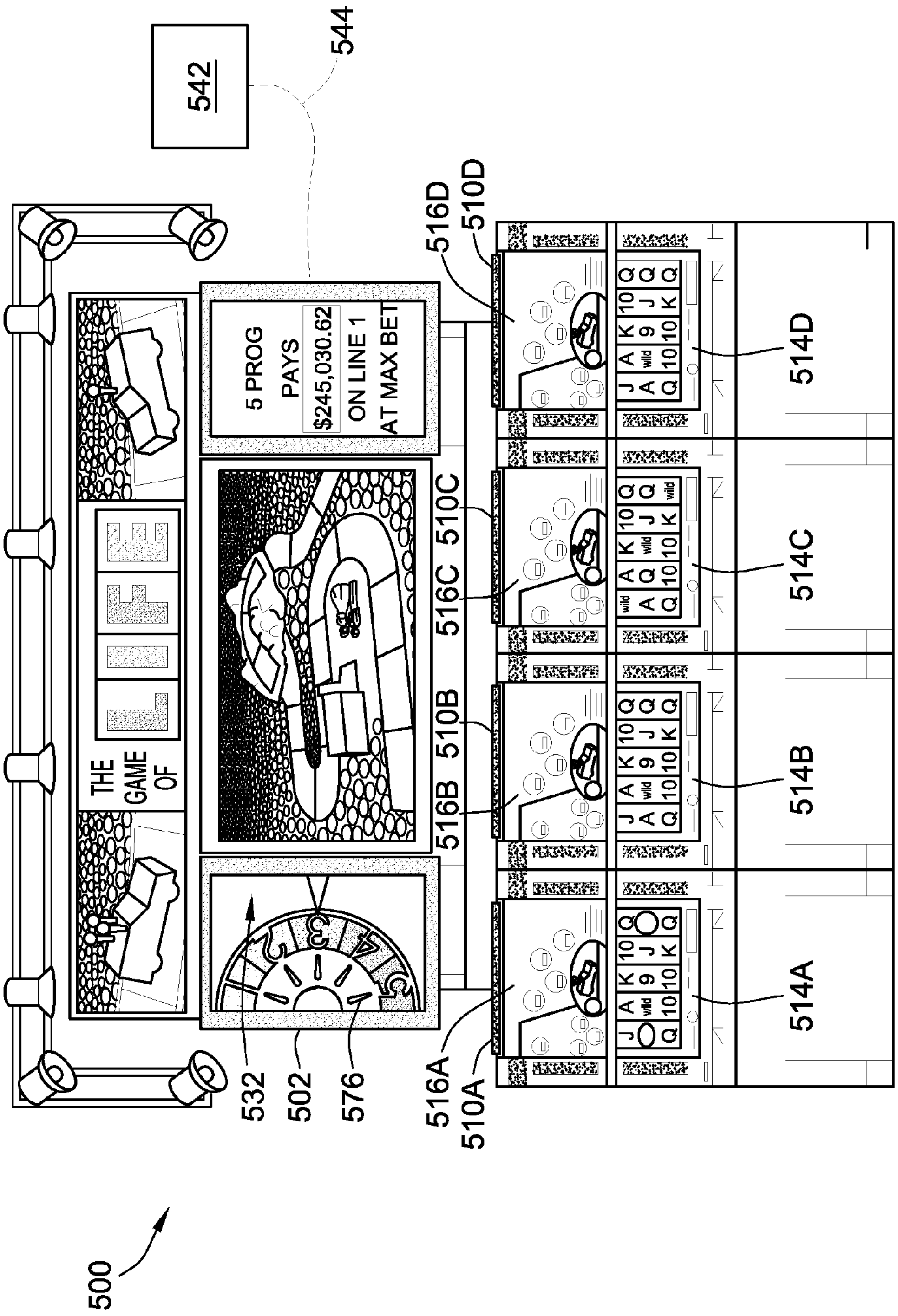
FIG. 5 is a perspective-view illustration of a representative gaming system for playing an exemplary wagering game in accordance with aspects of the present disclosure.

Referring now to FIG. 5, an exemplary gaming system, designated generally at 500, comprising a plurality of gaming terminals 510A-D (also known as a "terminal bank") is shown in accordance with aspects of the present disclosure. Although differing in appearance, the gaming terminals 510A-D can be similar in function, operation, and connectivity to the gaming terminals 10 and 100 discussed above with respect to FIGS. 1A and 1B, respectively. Each gaming terminal 510A-D includes a primary display 514A-D and an optional secondary display 516A-D, both of which can be supported by a respective housing 512A-D. The gaming terminals 510A-D of FIG. 5 can take on various alternative configurations, including upright freestanding gaming machines (e.g., gaming terminal 10 of FIG. 1A), slant-top freestanding gaming machines (e.g., gaming terminal 100 of FIG. 1B), handheld gaming machines, countertop gaming machines, handheld portable gaming devices, personal computers or laptop computers, smartphones, or other known gaming devices, individually or in any combination thereof. Moreover, the gaming system 500 may comprise greater or fewer than the four terminals illustrated in FIG. 5 without departing from the scope and spirit of the present disclosure.

Each gaming terminal 510A-D may communicate with an external system (e.g., external system(s) 46 of FIG. 2) such that the terminal operates as a "thin client," a "thick client," or through any range of functionality therebetween. The primary displays 514A-D of each gaming terminal 510A-D display wagering games, such as those described above with respect to FIGS. 3 and 4 or those described below with respect to FIGS. 6-14, for example. The various terminals 510A-D may display the same wagering game(s) or each may display a different wagering game. In the illustrated embodiment, the wagering game displayed by each of the gaming terminals 510A-D is the reel-type slot game illustrated in FIG. 6, which is developed in further detail below.

A controller, which is schematically illustrated at 542 in FIG. 5, is operatively connected to, and can operatively connect together, the gaming terminals 510A-D such that players at each of the gaming terminals 510A-D can play a shared game or community game, such as the community wagering game 532, for example. The controller 542 may be similarly configured in accordance with any of the optional configurations described above with respect to the CPU 42 of FIG. 2. In some optional embodiments, the controller 542 takes on the form of a central server, central controller, and/or remote host that links to the gaming terminals 510A-D through a data network or remote communication link 544. In some representative arrangements, the controller 542 is a community controller, which controls at least the community portion 532 of a wagering game 530. To that end, the processor of each gaming terminal 510A-D, in some embodiments, can be designed to transmit and receive events, messages, commands, and any other suitable data or signals between the individual gaming terminals 510A-D and the controller 542.

The system 500 of FIG. 5 further includes a community display 502, which is shown mounted above and supported by the gaming terminals 510A-D. The community display 502 may comprise a secondary video display, such as a plasma, LED, LCD, CRT, projection, or any other now known or later developed display device. Information relevant to the community wagering game, or selected portions thereof, is displayed via the community display 502 so that it is visible to players of the gaming terminals 510A-D. The community wagering game may be one of any number of bonus games, group games, competition games, etc., and may involve interaction, competition, collaboration or common outcomes for a plurality of players of the gaming terminals 510A-D. The system 500 may further include signage 504, which comprises other labels, signs, indicators, or markings relating to advertising, promotions, or a theme of one or more of the gaming terminals 510A-D or one or more community wagering games. In the embodiment shown, the signage 504 is The Game of Life™, also known simply as LIFE™, and is related to a theme of the illustrated community wagering game 532 displayed on the community display 502. Although different aspects of the wagering game 530 are shown displayed separately via different display devices (i.e., the primary display 514, the secondary display 516, or the community display 502), these aspects are not so limited and can be displayed in any combination on any number of display devices unless otherwise logically restricted.

Figure 6:
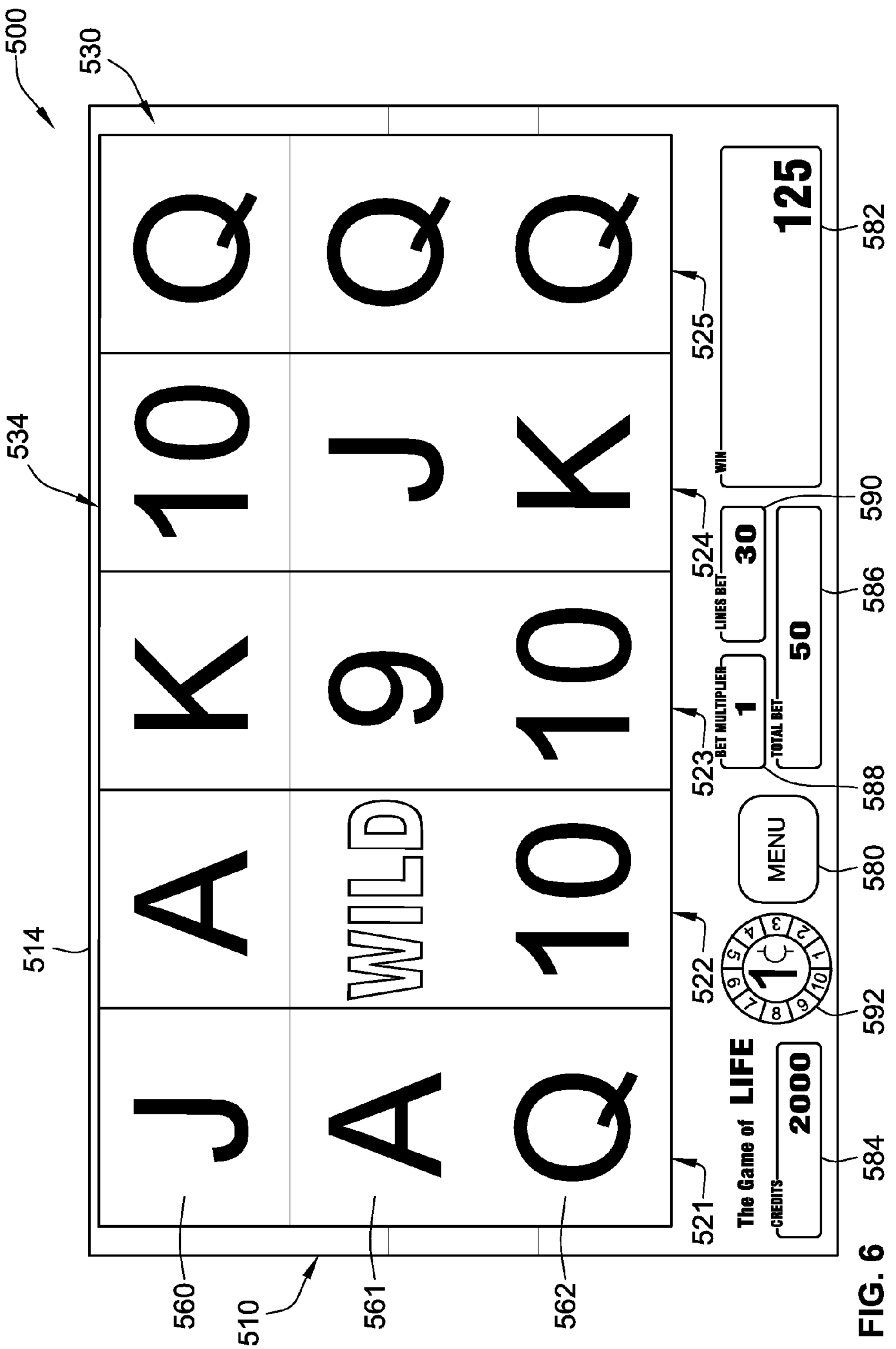
FIG. 6 is a screen shot of a basic-game screen from an exemplary wagering game that can be played on one or more of the gaming terminals in the representative gaming system of FIG. 5.

The primary display 514 of one of the gaming terminals 510 of the exemplary gaming system 500 (FIG. 5) is portrayed for explanatory purposes in FIG. 6. The display 514 displays or otherwise visually depicts a base-game portion 534 of the wagering game 530, which in this example is the slot game shown in FIG. 6. The slot game 534 includes a plurality of symbol-bearing reels, designated generally as 521-525, respectively, each having a plurality of distinct symbol positions and bearing an array of symbols (collectively represented by symbols 560-562 in FIG. 6). The symbols may include any variety of graphical symbols, emblems, elements, or representations, including symbols that are associated with one or more themes (e.g., a LIFE™ board game theme) of the gaming terminal 510 and gaming system 500. The symbols may also include a blank symbol or empty space. The symbols on the reels 521-525 are arranged in an array or matrix, which in this embodiment is a 3×5 matrix of symbols. The reels 521-525 are varied (e.g., spun and stopped) to reveal combinations of symbols, which represent randomly selected outcomes of the wagering game 530, that are evaluated for winning combinations. Winning combinations of symbols landing, for example, on activated paylines (e.g., those paylines for which a wager has been received), cause awards to be paid in accordance with one or more pay tables associated with the gaming system 500.

Within the scope of this disclosure, the wagering game 530 can include fewer or additional symbol-bearing reels (simulated, mechanical, or combinations thereof), fewer or additional symbol bearing positions than those shown in FIG. 6, or any logical combinations thereof. In alternate embodiments, the randomly selected outcomes may comprise greater or fewer than 15 symbols, and may take on a variety of different forms having greater or fewer rows or columns. The matrix may even comprise other non-rectangular forms or arrangements of symbols. Moreover, the randomly selected outcomes of the wagering game 530 may be varied from the representation provided in FIG. 6. Likewise, the LIFE™ board game theme is purely illustrative and non-limiting in nature.

The primary display 514 further includes certain display features for providing information and options to a player. For example, the display 514 features may include a MENU button 580, a WIN meter 582, a CREDITS meter 584, and a TOTAL BET meter 586. The MENU button 580 can be pressed and activated (e.g., through an overlying touch screen) by a player desiring to access other control menus, preferences, help screens, etc. For example, the player can change a theme of the wagering game 530 via the MENU button 580, or change the type of wagering game being played (e.g., to video poker, blackjack, keno, etc.). The WIN meter 582 displays to the player the amount of the total win (if any) from the most recent play of the wagering game 530. The CREDITS meter 584 displays to the player the total amount of credits (if any) remaining and available to the player for play of the wagering game 530. The TOTAL BET meter 586 displays to a player the current size of his/her wager (in credits).

Fewer, additional or alternative display features may be included for presenting information and options to a player. In a specific instance, the display 514 also features a BET MULTIPLIER meter 588, which displays the numeric value of a multiplier, if any, associated with a past, present or future wagering game award, and a LINES BET meter 590, which displays the numeric value of a total number of active pay lines associated with a past, present or future wagering game. The primary display 514 can also include, for example, an optional change-denomination button 592 that can be activated to change the denomination of wagers which the player is inputting into the system 500. Other features may include one or more bet change buttons that permit a player to incrementally increase or decrease the size of his/her wager, a "max bet spin" button for wagering a maximum number of credits and contemporaneously varying the reels of the wagering game 530, as well as any of the buttons and meters displayed in FIG. 3 or other now known or hereinafter developed.

Figure 7:
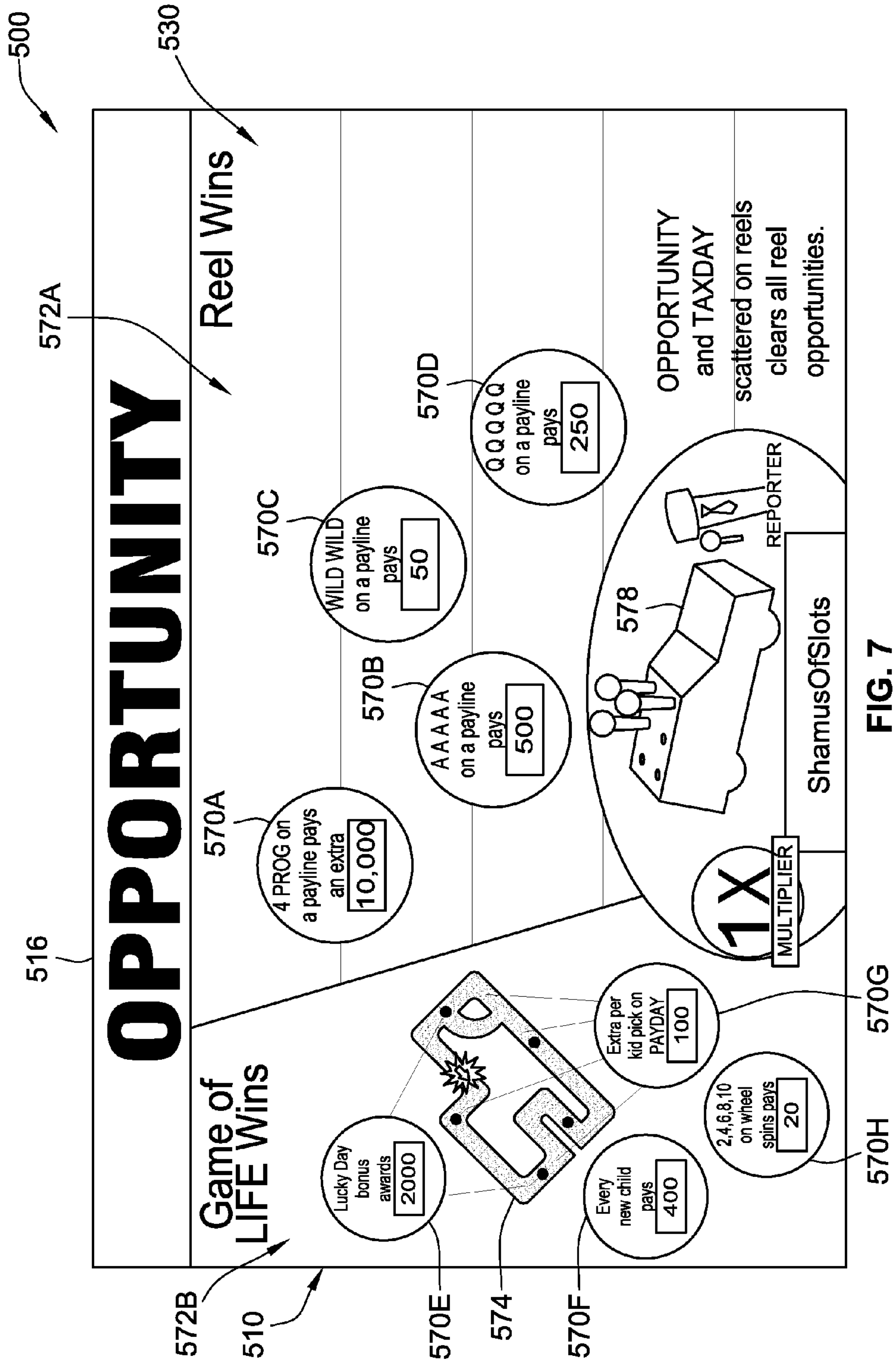
FIG. 7 is a screen shot of an example of an opportunity screen showing a number of representative symbol-driven expected-value (EV) enhancements resulting from play of the basic-game portrayed in FIG. 6.

Turning next to FIG. 7, where like reference numerals refer to like objects and features from FIGS. 5 and 6, a secondary display 516 of one of the gaming terminals 510 from the exemplary gaming system 500 is shown. A variety of representative symbol-driven expected-value (EV) game enhancements 570A-H (also referred to herein as "EV-increasing opportunities") are displayed via the secondary display device 516. As will be developed in further detail below, each of the EV-increasing opportunities 570A-H modifies a respective parameter of the wagering game 530, whereby the expected value of the wagering game 530 is increased. In a non-limiting example, the EV of a base game can be expressed as:

$$EV \underset{all\ x}{=} \Sigma(\text{Frequency}(x) \times \text{Pay}(x))$$

where Frequency(x) is the frequency of occurrence of an event x in the base game, and Pay(x) is the payout value assigned to that event. A similar mathematical relationship can be applied to quantify the EV of a bonus game and other segments of the wagering game 530. Additional discussions related to expected values of wagering games are provided in commonly owned, co-pending U.S. patent application Ser. No. 12/514,426, which was filed on Nov. 9, 2007, commonly owned, co-pending U.S. patent application Ser. No. 12/061,500, which was filed on Apr. 2, 2008, and commonly owned U.S. Pat. No. 7,704,137 B2, to Allon G. Englman, which issued on Apr. 27, 2010, all of which are incorporated herein by reference in their respective entireties.

The EV-increasing opportunities shown in FIG. 7 can be divided into two groups: Group 1: basic-game EV-increasing opportunities, collectively designated 572A; and Group 2: bonus-game EV-increasing opportunities, collectively designated 572B. Generally speaking, each of the basic-game EV-increasing opportunities 572A modifies a parameter of the base-game portion 534 of the wagering game 530, thereby increasing the overall EV of the wagering game 530. Contrastingly, each of the bonus-game EV-increasing opportunities 572B modifies a parameter of the bonus-game portion 536 (see FIG. 12) of the wagering game 530, thereby increasing the overall EV of the wagering game 530. These opportunities are symbol driven from the reels, and the collection thereof alters a player's gaming experience over time. Some embodiments of the present disclosure may include only basic-game EV-increasing opportunities or only bonus-game EV-increasing opportunities, whereas other embodiments will draw no such distinction, thus comprising just wagering game EV-increasing opportunities.

Four non-limiting examples of basic-game EV-increasing opportunities 572A are shown in FIG. 7. The first basic-game EV-increasing opportunity 570A is an award-supplement modifier that operates, when active, to enhance an award value associated with a particular winning symbol combination with a supplemental prize. In the illustrated embodiment, the first EV-increasing opportunity 570A supplements the award value associated with four PROG (progressive) symbols appearing on an active payline with a 10,000-credit supplemental award. The second, third and fourth basic-game EV-increasing opportunities 570B, 570C and 570D, respectively, are each an award-value modifier that operates, when active, to increase an award value associated with a particular winning symbol combination. In the illustrated embodiment, for example, the second basic-game EV-increasing opportunity 570B increases the award value associated with five A-symbols appearing on an active payline to 500 credits. Likewise, the third basic-game EV-increasing opportunity 570C increases the award value associated with two WILD-symbols appearing on an active payline to 50 credits, whereas the fourth basic-game EV-increasing opportunity 570D increases the award value associated with five Q-symbols appearing on an active payline to 250 credits.

In addition to the basic-game EV-increasing opportunities 572A, there are four examples of bonus-game EV-increasing opportunities 572B displayed via the secondary display 516 of FIG. 7. The first and second bonus-game EV-increasing opportunities 570E, 570F are each a bonus-award-value modifier that operates, when active, to increase an award value associated with a particular outcome of the bonus game 536. In the illustrated embodiment, for example, the first bonus-game EV-increasing opportunity 570E increases to 2000 credits the value of a "Lucky Day" bonus award associated with a player landing on either of two particular sections of The Game of Life™ trail 574. In contrast, the second bonus-game EV-increasing opportunity 570F increases to 400 credits the value of the bonus award associated with a player collecting a new child during the "Big Events" bonus game 536, e.g., by drawing a game card or landing on a particular square of the trail 574 that awards a new child. The third bonus-game EV-increasing opportunity 570G is an award-generating modifier which operates, when active, to add a new prize to a particular aspect of the bonus game 536. In the illustrated embodiment, for example, the third bonus-game EV-increasing opportunity 570G adds a 20-credit bonus award every time The Game of Life™ wheel 576 (FIG. 5) lands on 2, 4, 6, 8 or 10 during a "Speed Spins" bonus game. Finally, the fourth bonus-game EV-increasing opportunity 570H is a bonus-pick modifier that operates, when active, to increase the number of selections available to a player during a selection-based bonus game (see, e.g., FIG. 4). As seen in FIG. 7, for example, the fourth bonus-game EV-increasing opportunity 570H provides the player with an additional pick (i.e., selection) during play of a PAYDAY bonus game for each child the player has accumulated.

The various EV-increasing opportunities 570A-H shown in FIG. 7 and described above are purely exemplary in nature and, thus, are not intended to be limiting. As such, additional or alternative EV-increasing opportunities from those shown in FIG. 7 can be employed within the scope of the present disclosure. By way of non-limiting example, other EV-increasing parameter modifications of the wagering game can be drawn to creating new winning symbol combinations, creating additional bonus-game triggers/symbol combinations, increasing the payout frequency for a preexisting winning symbol combination, increasing the number of spins in a reel- or wheel-based bonus game, adding a new multiplier or increasing a preexisting multiplier on base-game wins or bonus awards, increasing value or values in a triggered bonus, reducing thresholds for triggering a bonus, adding additional paylines, increasing the number of available WILD symbols on the reels, etc. In some embodiments, the value of an EV-increasing opportunity (i.e., the extent to which it increases the EV of the wagering game) can be tied directly to the size of the wager submitted for the play of the wagering game which triggered the EV-increasing opportunity. Optionally, once an EV-increasing opportunity has been activated, the value of that opportunity does not change due to the player raising or lowering subsequent bets.

Figure 8:
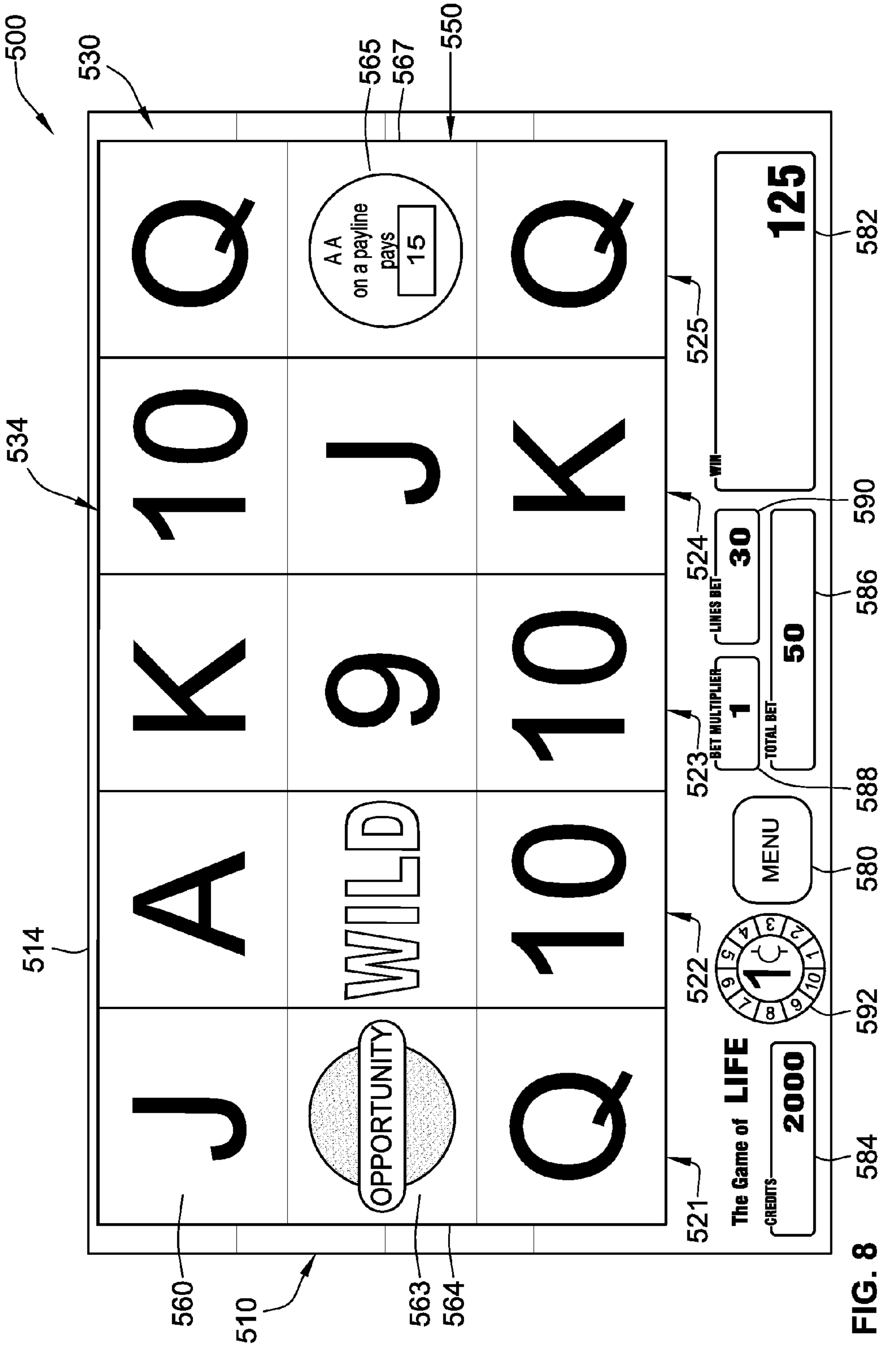
FIG. 8 is another screen shot of the basic-game screen of FIG. 6, showing an example of a symbol-driven trigger that activates an expected-value game enhancement.

The wagering game 530 is shown in FIG. 8 after play of the base game 534 is initiated, for example, by the player providing a wager and pushing a spin button or pulling a spin lever. The monetary wager (e.g., a selected number of credits) is deducted from the available credits, as displayed via the CREDITS meter 584. The monetary wager that is in play can be displayed via the TOTAL BET meter 586. FIG. 8 illustrates the reels 521-525 after being varied—e.g., spun and stopped; the reels continue to spin until they are stopped to reveal combinations of symbols which represent a randomly selected outcome of the base game. The base-game outcome is, according to some aspects, randomly determined from a plurality of potential base-game outcomes. As indicated above, each outcome is evaluated for winning combinations—to determine if the base-game outcome has one or more base-game awards associated therewith.

A local controller (e.g., CPU 42 of FIG. 2), a host system (e.g., external system 46 of FIG. 2), the central controller 542 (FIG. 5), or any combination thereof, in alternative embodiments, operates to execute the wagering game program causing each of the various display areas 514, 516 to display selected portions of the wagering game 530. An outcome of the wagering game can be randomly selected from a plurality of potential wagering-game outcomes (e.g., using a local random number generator (RNG)). The wagering-game outcome is then revealed, displayed, or otherwise communicated to the player, for example, on a corresponding display 514. In FIG. 8, the game screen 514 displays the wagering-game outcome by portraying the plurality of simulated reels 521-525 spinning and stopping to reveal a plurality of symbols arranged in a 3-row, 5-column matrix. A winning combination occurs, for example, when the displayed symbols correspond to one or more of the winning symbol combinations listed in a pay table. In response, a base-game prize (also referred to as "base-game award") associated with a winning outcome is conferred upon the player.

Figure 10:
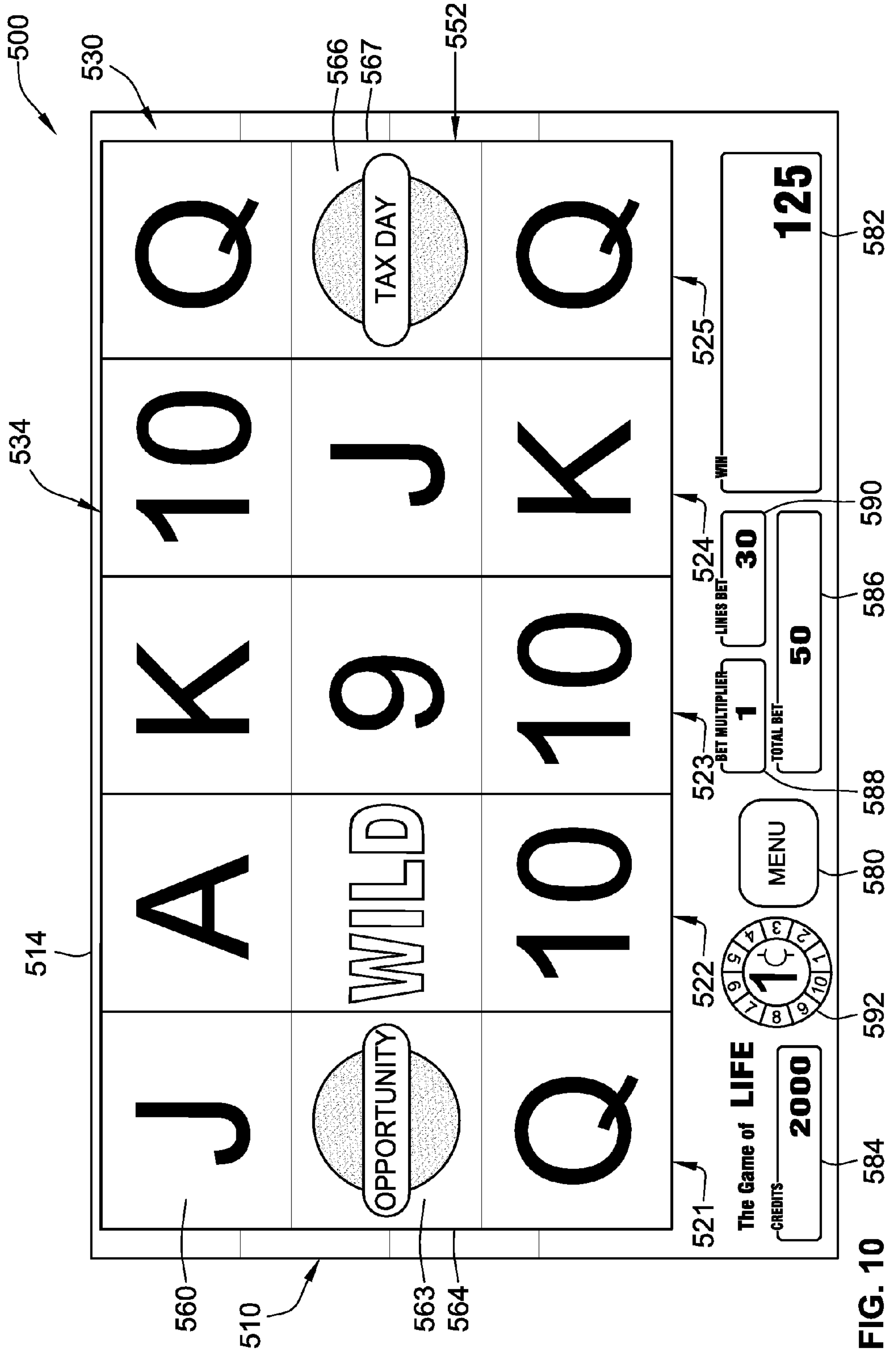
FIG. 10 is another screen shot of the basic-game screen of FIG. 6, showing an example of a symbol-driven trigger that eliminates one or more expected-value game enhancements accumulated by a player.

Along with the various prize-winning symbol combinations, the displayed base-game outcome may include a combination of symbols that corresponds to an expected-value enhancement symbol combination, designated generally as 550 in FIG. 8, or an expected-value elimination symbol combination, designated generally as 552 in FIG. 10. (Note: the use of "expected-value elimination" in the context of this disclosure is not intended to imply or suggest the actual elimination of the expected value of the wagering game, but may include the reduction to zero of an EV associated with a segment or aspect of the wagering game which concomitantly reduces the overall EV of the wagering game.) The EV-enhancement and EV-elimination symbol combinations 550, 552 are, generally speaking, both symbol-driven ("symbol-based") events, and are therefore dependent upon the displayed outcome of the wagering game. In some embodiments, each of these symbol-driven activation events may comprise, for example, one or more symbols aligning in a similar manner on an active payline (or, alternatively, on an inactive payline), a group of symbols arranged in a similar manner in one or more predetermined patterns, etc. The EV-enhancement and EV-elimination symbol combinations 550, 552 exemplified in the drawings both include at least one common symbol arranged in a common manner. With reference to both FIGS. 8 and 10, the common symbol is a shared activation symbol 563 (shown as an OPPORTUNITY symbol) positioned at a first location 564 within a predetermined symbol array (e.g., on the first reel 521, in the center row). In alternative configurations, the common symbol can include a number of shared activation symbols each of which is arranged at a respective location on the symbol array. In this vein, the shared activation symbol can comprise a different type of symbol and, in some configurations, can be positioned at a different location than what is shown in FIGS. 8 and 10.

With continuing reference to both FIGS. 8 and 10, the EV-enhancement and EV-elimination symbol combinations 550, 552 each comprise, in addition to the common, shared activation symbol 563, a respective activation symbol positioned at a second location within a predetermined symbol array. In the illustrated embodiment, the EV-enhancement symbol combination 550 includes an EV-enhancement activation symbol 565 positioned at a second location 567 within the symbol array (e.g., on the fifth reel 525, in the center row). The EV-elimination symbol combination 552, on the other hand, includes a dedicated EV-elimination activation symbol 566 (shown as a TAX DAY symbol) that is separate and distinct from the EV-enhancement activation symbol 565, but also positioned at the second location 567 within the symbol array. In alternative configurations, the respective activation symbol can include a plurality of respective activation symbols each of which is arranged at a respective location on the symbol array. In this vein, the respective activation symbol can comprise a different type of symbol and, in some embodiments, can be positioned at a different location than what is shown in FIGS. 8 and 10 of the drawings.

The activation symbols of the EV-enhancement symbol combination(s) 550, EV-elimination symbol combination(s) 552, or both, can visually depict or otherwise identify the parameter of the wagering game being modified thereby. As seen in FIG. 8, for example, the exemplary EV-enhancement activation symbol 565 activates a basic-game EV-increasing opportunity which is an award-value modifier that operates, when active, to increase an award value associated with a particular winning symbol combination. For instance, the basic-game EV-increasing opportunity associated with the activation symbol 565 of FIG. 8 increases to 15 credits the award value associated with two A-symbols appearing as part of a game outcome on an active payline. In a similar respect, a currently active EV-increasing opportunity can be identified by the EV-elimination activation symbol 566 of FIG. 10 to indicate that that opportunity is being deactivated.

Figure 9:
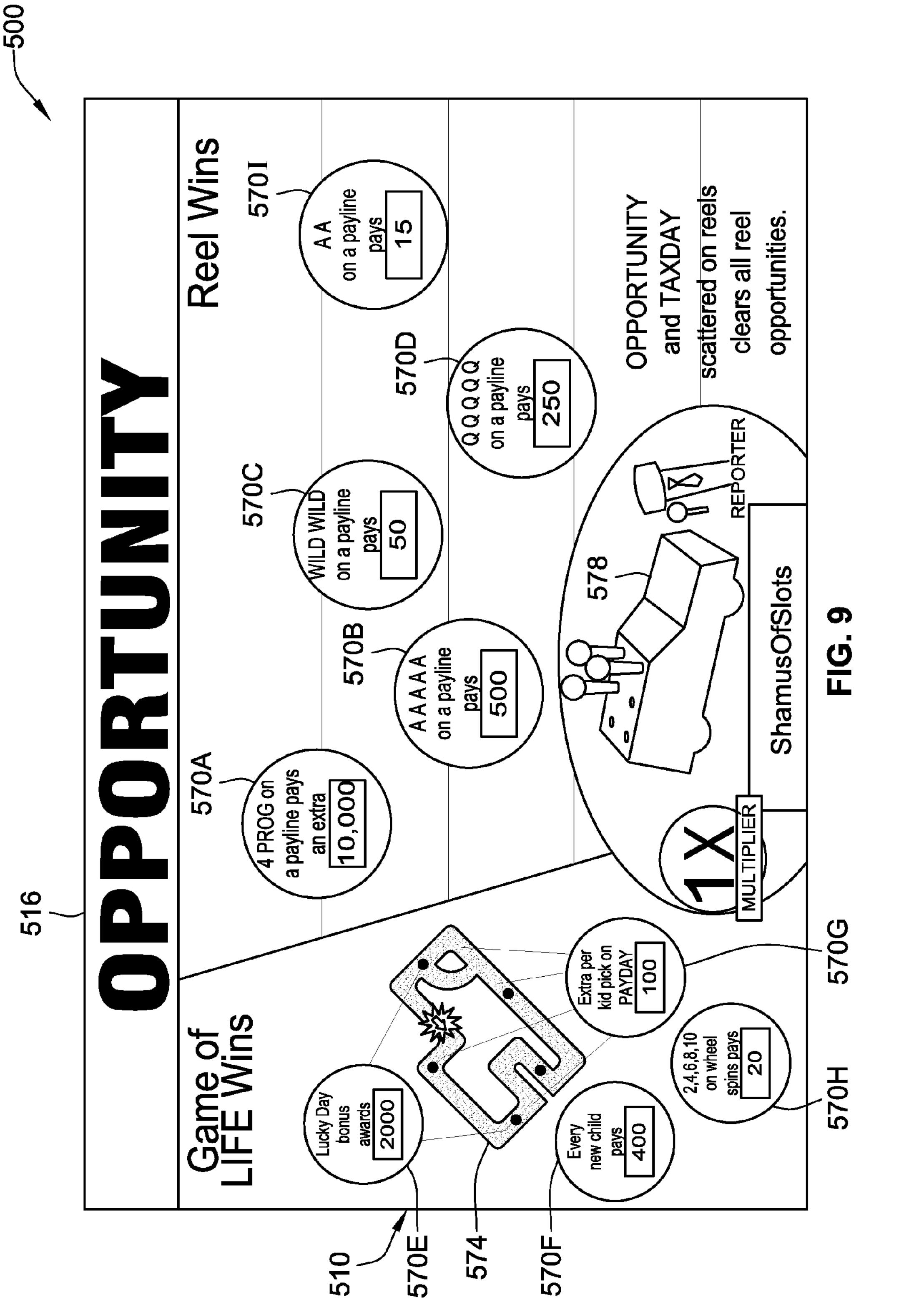
FIG. 9 is another screen shot of the opportunity screen of FIG. 7, showing the activation of the expected-value game enhancement triggered in FIG. 8.

When the displayed base-game outcome includes a combination of symbols that corresponds to a predetermined EV-enhancement symbol combination, such as the EV-enhancement symbol combination 550 exemplified in FIG. 8, the wagering game 530 responsively activates one or more EV-increasing opportunities. FIG. 9, for example, illustrates a new EV-increasing opportunity 570I being added to the player's OPPORTUNITY screen. This EV-increasing opportunity 570I corresponds to the basic-game EV-increasing opportunity associated with the activation symbol 565 of FIG. 8. In some embodiments, once an opportunity is earned, the opportunity remains part of gaming experience until it is eliminated. In other words, the activated EV-increasing opportunity 570I will remain available for all subsequent plays of the wagering game until the activated EV-increasing opportunity is deactivated, for example, via a displayed combination of symbols corresponding to the EV-elimination symbol combination. Alternative configurations can allow the activated EV-increasing opportunity 570I to remain available for only a predetermined number of subsequent plays or until the player ends his/her current gaming session (e.g., cashes out and leaves their gaming terminal). In some embodiments, the wagering game allows for the unlimited accumulation of activated EV-increasing opportunities. In other embodiments, the number of EV-increasing opportunities which may be accumulated can be limited, for example, by a predetermined limit. Optionally, there may be eligibility requirements for a player to activate certain EV-increasing opportunities. In other embodiments, players may be provided the option of "cashing in" EV-increasing opportunities—e.g., a player could be compensated for deactivating a selected EV-increasing opportunity, for example, by awarding a set amount, by entering the player into a bonus game, or awarding a random amount based on the amount already collected.

In the same manner that the EV-increasing opportunities 750A-I are collected, they can also be removed. For example, the wagering game 530 is shown in FIG. 10 after another play of the base game 534 (e.g., after the reels 521-525 were spun and stopped). Similar to the screen shot provided in FIG. 8, it may be desirable that the outcome of the base-game portion 534 of FIG. 10 be randomly selected from a plurality of potential wagering-game outcomes (e.g., using an RNG). The base-game outcome is evaluated for any winning symbol-combinations, and awards associated with those winning combinations, if any, are credited to the player. Contemporaneously therewith, the displayed base-game outcome is evaluated to determine if the EV-enhancement symbol combination 550 or the EV-elimination symbol combination 552 is part of the base-game outcome. In this instance, the base-game outcome includes one, of what may be a variety of possible EV-elimination symbol combinations 552—a shared activation OPPORTUNITY symbol 563 positioned in the first location 564, i.e., on the first reel 521 in the center row of the symbol array, and an EV-elimination activation TAX DAY symbol 566 positioned in the second location 567, i.e., on the fifth reel 525 in the center row of the symbol array.

Figure 11:
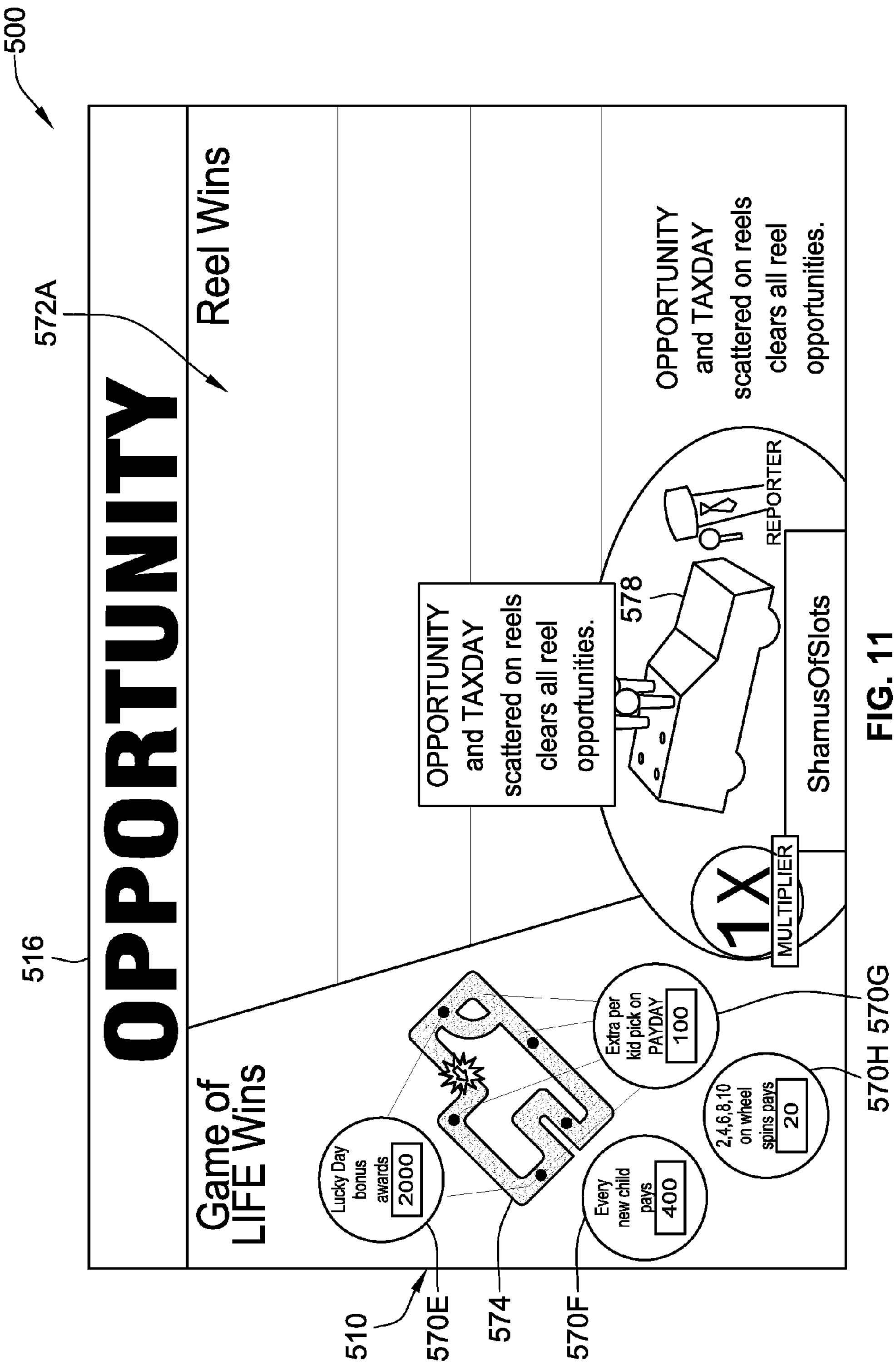
FIG. 11 is another screen shot of the opportunity screen of FIG. 7, showing the elimination of the one or more expected-value game enhancements eliminated in FIG. 10.

When the displayed base-game outcome includes a combination of symbols which corresponds to a predetermined EV-elimination symbol combination, such as the EV-elimination symbol combination 552 exemplified in FIG. 10, the wagering game 530 responsively deactivates one or more previously activated EV-increasing opportunities. FIG. 11, for example, illustrates all of the previously activated basic-game EV-increasing opportunities (e.g., 750A-D and 7501 in FIG. 9) being eliminated from the player's OPPORTUNITY screen as a result of the EV-elimination symbol combination 552 in FIG. 10. Optionally, all collected opportunities (e.g., both basic-game and bonus-game EV-increasing opportunities 572A, 572B) are eliminated when a shared activation OPPORTUNITY symbol 563 and an EV-elimination activation TAX DAY symbol 566 appear in proper combination on the array. In other embodiments, the game enhancement opportunities 570A-H are eliminated one-by-one, for example, in the same manner as they are collected, sequentially, at random, or in any known manner. According to one non-limiting example, if the shared activation OPPORTUNITY symbol 563 lands on the first location 564 concurrently with a TAX DAY symbol identifying "modified A-A symbol combinations" landing on the second location 566, the basic-game EV-increasing opportunity 570I associated with the activation symbol 565 of FIG. 8 is eliminated from the player's OPPORTUNITY screen and must be otherwise be re-activated. In some optional configurations, a predetermined EV-elimination symbol combination can decrease the overall expected value of the wagering game, for example, by downgrading a payout for a preexisting winning combination, reducing the number of spins/picks in a bonus game, etc. It is also possible to provide the player with the option of "buying out" a tax day, e.g., by paying a penalty, the player can keep the currently activated EV-increasing opportunities.

Figure 12:
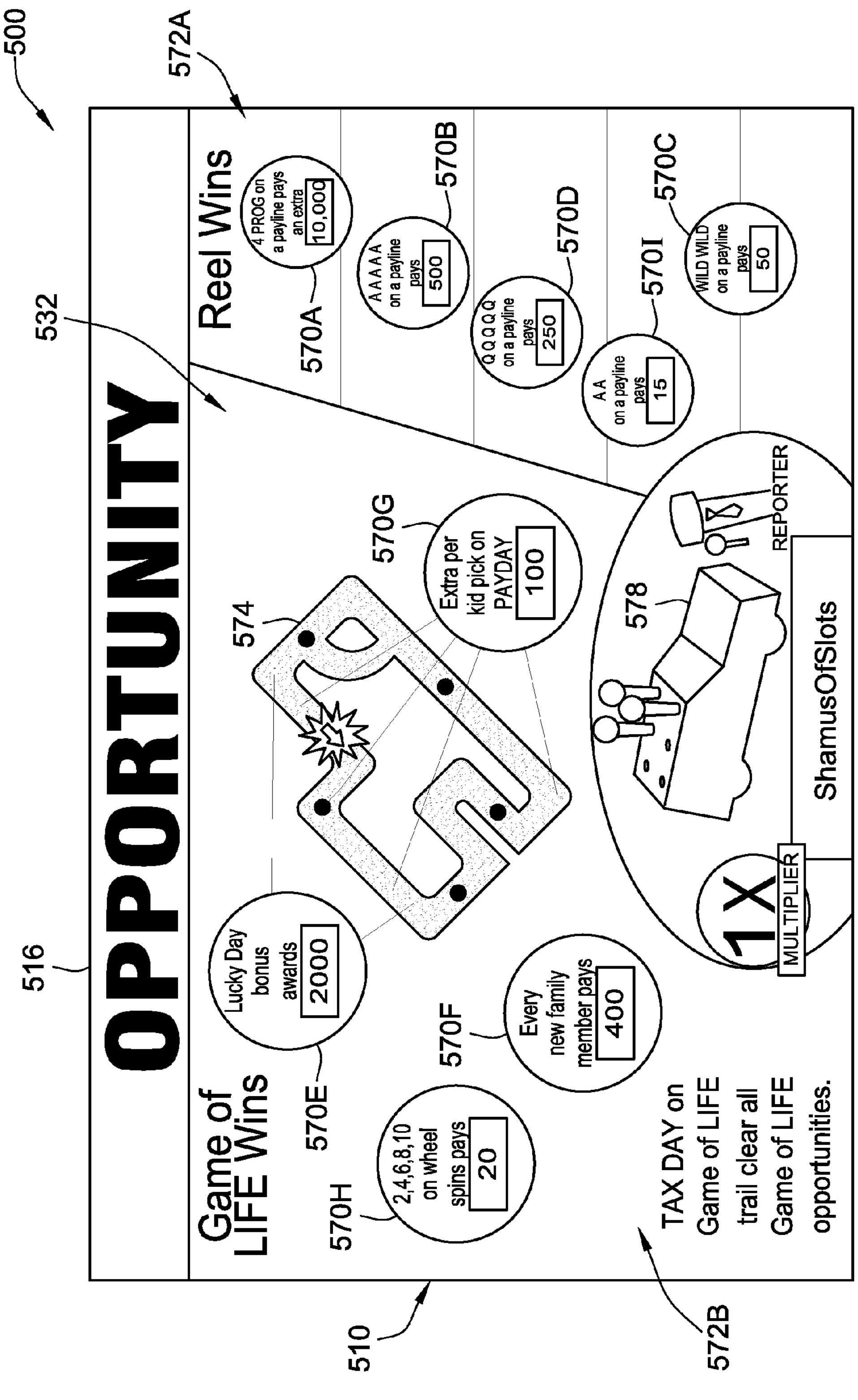
FIG. 12 is a screen shot of a representative bonus event game screen in accordance with aspects of the present disclosure.

FIG. 12 is a screen shot illustrating a representative bonus game 532 in accordance with aspects of the present disclosure. The bonus game 532, in some embodiments, is a BIG EVENT bonus game mimic's some aspects of the classic board game, The Game of Life™ (or LIFE™), simulating a person's travels through his or her life, from college to retirement, with jobs, marriage, and possible children along the way. One or more players can simultaneously participate in the BIG EVENT bonus game 532. When this bonus event 532 is triggered, a player is provided with one or more spins of The Game of Life™ wheel 576, which can be displayed via the community display 502 of FIG. 5 or any of the other gaming system displays, such as the terminal displays 514A-D and 516A-D. The number on which the wheel lands 576 indicates the number of spaces a player advances along The Game of Life™ trail 574. Each player, as well as his or her progress in the BIG EVENT bonus game, may be represented by a respective small, individually colored, plastic-looking automobile 578. Each car has six holes in the top in which blue and pink "people pegs" are placed throughout the game as the player "gets married" and has or adopts "children." Distributed at locations along the trail 574 are, in any combination, credit pays, family members, bonus games, Life cards, Tax Days.

In some embodiments, a player can also activate EV-increasing opportunities during the bonus game, e.g., during a free spins bonus game feature. These EV-increasing opportunities can operate to modify respective parameters of the base game, the bonus game, or both, to thereby increase the overall expected value of the wagering game. In some embodiments, bonus-game EV-increasing opportunities 572B can only be activated or eliminated during play of the bonus game. A non-limiting example can include an outcome of a free-spin bonus game including an EV-enhancement symbol combination 550 or an EV-elimination symbol combination 552. According to further aspects, the bonus-game EV-increasing opportunities 572B remain until the player, as represented by the car 578, lands on a Tax Day square while traversing the Game of Life™ trail 574.

Figure 13:
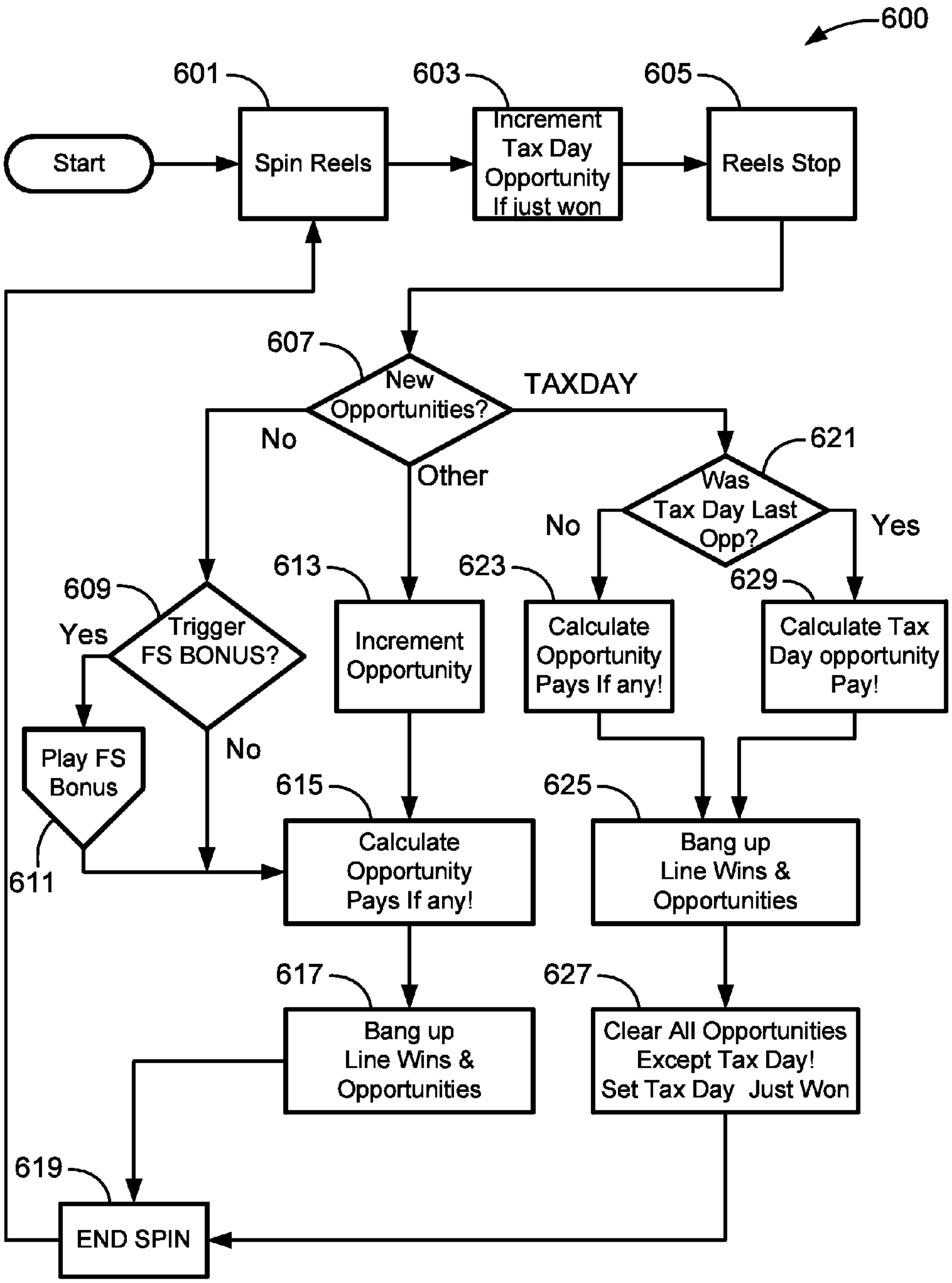
FIG. 13 is a flowchart for an exemplary method or algorithm that can correspond to instructions that can be stored on a non-transitory computer-readable medium and can be executed by a controller in accord with at least some aspects of the disclosed concepts.

With reference now to the flow chart of FIG. 13, an improved method for conducting a wagering game on a gaming terminal, such as one of the gaming terminals shown in FIGS. 1A, 1B and 5, or a gaming system, such one of the gaming systems shown in FIGS. 2 and 5, is generally described at 600 in accordance with aspects of the present disclosure. FIG. 13 can be representative of an algorithm that corresponds to at least some instructions that can be stored, for example, in memory 44 of FIG. 2, and executed, for example, by the controller 42, external system(s) 46 of FIG. 2, controller 542 of FIG. 5, or any other known or hereafter developed device, to perform any or all of the above or below described functions associated with the disclosed concepts. The method 600 will be described with reference to the various devices and displays shown in FIGS. 5-12 of the drawings; such reference is being provided purely by way of explanation and clarification and is therefore in no way limiting.

The method 600 begins at block 601 by spinning the reels 521-525 on the primary display 510. Prior to stopping the reels at block 605, it is determined if a "Tax Day Opportunity" has been won and, if so, the method 600 will increment accordingly, as indicated at block 603. For instance, when an OPPORTUNITY symbol 563 appears on the first reel 521, in the center row, concurrently with a TAX DAY symbol 566 on the fifth reel 525, in the center row, all currently activated game enhancement opportunities 570A-H would pay one final time before being deactivated.

Prior to, during, or after the stopping of the reels indicated at block 605, the method 600 determines at block 607 if any new expected-value game enhancement opportunities, such as EV-increasing opportunities 750A-I of FIG. 9, have been activated. Block 607 of FIG. 13 also includes determining if the symbols displayed on the reels 521-525 include an EV-elimination symbol combination. If no additional game enhancement opportunities were activated and the game outcome does not include an EV-elimination symbol combination (Block 607=No), the method 600 determines at block 609 if a free-spin bonus game was triggered. In some embodiments, three scattered BONUS symbols appearing as part of a displayed basic-game outcome operate to trigger the Free Spin bonus game. If so (Block 609=Yes), the free-spin bonus game is initiated at block 611. A predetermined number of free spins (e.g., eight free spins) can be provided to the player as part of the Free Spin bonus game. As explained above, the number of free spins can be modified via one or more bonus-game EV-increasing opportunities 572B. Upon completion of the Free Spin bonus game, the wagering game activates all of the opportunities they have earned. If a free-spin bonus game was not triggered (Block 609=No), the method 600 proceeds to block 615, which will be discussed in further detail below.

When the displayed base-game outcome includes a combination of symbols that corresponds to a predetermined EV-enhancement symbol combination, such as the EV-enhancement symbol combination 550 exemplified in FIG. 8, the wagering game 530 responsively activates one or more EV-increasing opportunities. If the method 600 determines at block 607 that one or more new expected-value game enhancement opportunities have been activated (Block 607=Other), the method 600 responsively adds the activated EV-increasing opportunity/opportunities to the player's OPPORTUNITY screen, such as was illustrated in FIG. 9. The method 600 then proceeds to block 615 where any EV-enhanced opportunity pays are calculated, and next to block 617 where line wins and EV-increasing opportunities are enhanced accordingly.

When the method 600 determines at block 607 that the symbols displayed on the reels 521-525 include an EV-elimination symbol combination (Block 607=TAXDAY), the method 600 determines at block 621 whether the Tax Day was the last opportunity. If not (Block 621=No), the method 600 calculates opportunity pays, if any, at block 623. If the Tax Day was the last opportunity (Block 621=Yes), the method 600 calculates Tax Day opportunity pays at block 629. The method 600 then proceeds from blocks 623 and 629 to block 625 where any EV-enhanced opportunity pays are calculated, and next to block 627 where line wins and EV-increasing opportunities are enhanced accordingly.

In some embodiments, the method 600 includes at least those steps enumerated above. It is also within the scope and spirit of the present invention to omit steps, include additional steps, or modify the order presented above. It should be further noted that the method 600 represents a single play of a wagering game. However, it is expected that the method 600 be applied in a systematic and repetitive manner.

Figure 14:
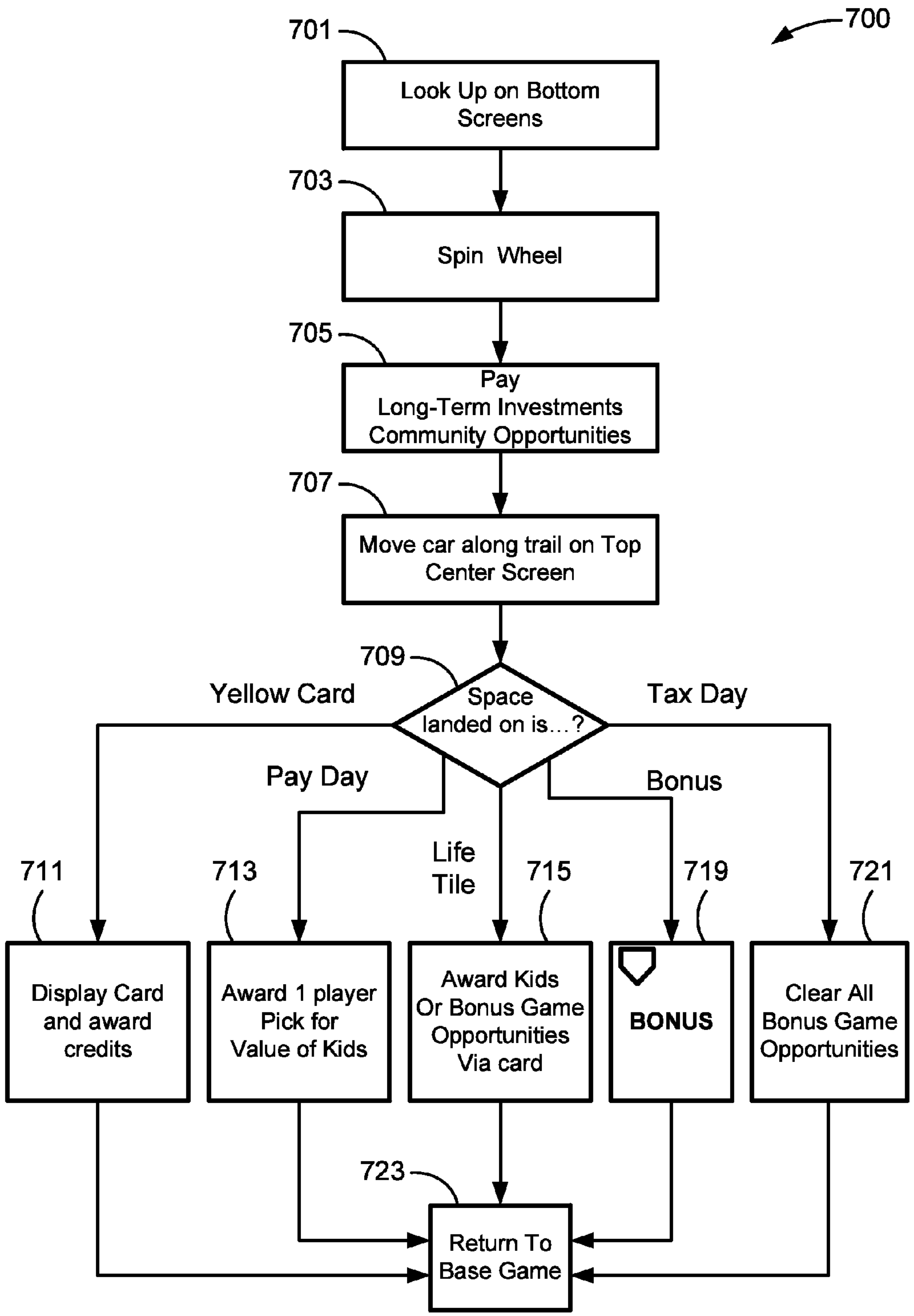
FIG. 14 is another flowchart for another exemplary method or algorithm that can correspond to instructions that can be stored on a non-transitory computer-readable medium and can be executed by a controller in accord with at least some aspects of the disclosed concepts.

With reference now to the flow chart of FIG. 14, an improved method for conducting a bonus game on a gaming terminal, such as one of the gaming terminals shown in FIGS. 1A, 1B and 5, or a gaming system, such one of the gaming systems shown in FIGS. 2 and 5, is generally described at 700 in accordance with aspects of the present disclosure. FIG. 14 can be representative of an algorithm that corresponds to at least some instructions that can be stored, for example, in memory 44 of FIG. 2, and executed, for example, by the controller 42, external system(s) 46 of FIG. 2, controller 542 of FIG. 5, or any other known or hereafter developed device, to perform any or all of the above or below described functions associated with the disclosed concepts. The method 700 will be described with reference to the various devices and displays shown in FIGS. 5-12 of the drawings; such reference is being provided purely by way of explanation and clarification and is therefore in no way limiting.

The bonus game represented in FIG. 14 may be part of the BIG EVENT bonus game discussed above with respect to FIG. 12. In the illustrated embodiment, the method 700 begins at block 701 by prompting the player(s) at the gaming terminals 510A-D to redirect their attention to a secondary display 516A-D (e.g., the bonus game may be an individual bonus game), a community display 502 (e.g., the bonus game may be a community wagering game), or both. This can include freezing or restricting any subsequent plays of the base-game portion 534 until after completion of the bonus game 532. At block 703, The Game of Life™ wheel 576 (FIG. 5) is spun at least once (and in some embodiments multiple times). Prior to, contemporaneous with, or after the wheel 576 is spun, all long-term investments and community opportunities are calculated and paid out to the appropriate players at block 705. After the wheel 576 is spun and stopped, one or more of the players move at block 707 a corresponding number of spaces, e.g., via their respective automobiles 578, along The Game of Life™ trail 574. The method 700 then includes determining what space the player(s) each landed on at block 709.

A player may land on a section of The Game of Life™ trail 574 which includes drawing a Life card, whereat the method 700 displays the Life card, e.g., via community display 502, and confers any corresponding awards and prizes on the player at block 711. Optionally, the player may land on a section of The Game of Life™ trail 574 that triggers a Pay Day bonus, during which the player is provided with a selection during play of a PAYDAY bonus game for each child the player has accumulated at block 713. The number of selections available to the player during the PAYDAY selection-based bonus game can be modified by an active EV-increasing opportunity, such as the fourth bonus-game EV-increasing opportunity 570H discussed above with respect to FIG. 7.

The method 700 may determine at block 709 that the player landed on a section of The Game of Life™ trail 574 that includes a Life Tile, whereat the player is awarded additional children or bonus game EV-increasing opportunities at block 715. Otherwise, the player may land on a section of The Game of Life™ trail 574 that includes another bonus game or bonus award, as indicated at block 718, or a Tax Day tile, whereat all bonus-game EV-increasing opportunities (e.g., 572B of FIG. 7) are cleared at block 721. From blocks 711, 713, 715, 719 and 721, the method 700 end the bonus-game portion 536 and returns to the base-game portion 534 of the wagering game.

In some embodiments, the method 700 includes at least those steps enumerated above. It is also within the scope and spirit of the present invention to omit steps, include additional steps, or modify the order presented above. It should be further noted that the method 700 represents a single play of a wagering game. However, it is expected that the method 700 be applied in a systematic and repetitive manner.

Any of the methods described herein can include machine readable instructions for execution by: (a) a processor, (b) a controller, or (c) any other suitable processing device. Any algorithm, software, or method disclosed herein can be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm or parts thereof could alternatively be executed by a device other than a controller or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine readable instructions represented in any flowchart depicted herein may be implemented manually. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, or some of the blocks described may be changed, eliminated, or combined.

While many preferred embodiments and best modes for carrying out the present invention have been described in detail above, those familiar with the art to which this invention relates will recognize various alternative designs and embodiments for practicing the invention within the scope of the appended claims.

The invention claimed is:

1. A gaming system, comprising:

an electronic gaming machine primarily dedicated to playing a casino wagering game, the electronic gaming machine including a gaming cabinet, an electronic display device, and an electronic input device, the gaming cabinet being constructed to house components associated with the casino wagering game, the electronic display device and the electronic input device being coupled to the gaming cabinet, the electronic input device being configured to receive a physical input from a player to initiate the casino wagering game and transform the physical input into an electronic data signal;

a random element generator configured to generate one or more random elements associated with play of the casino wagering game; and game-logic circuitry configured to:

initiate the casino wagering game in response to the electronic data signal generated by the electronic input device responsive to the physical input from the player;

determine an outcome of the casino wagering game based, at least in part, on the one or more random elements generated by the random element generator;

direct the electronic display device to display in a symbol array a combination of symbols indicative of the outcome of the casino wagering game;

determine if the displayed combination of symbols includes both a first expected value (EV) adjusting symbol and an activation symbol arranged in the array;

determine if the displayed combination of symbols includes both a second EV-adjusting symbol and the activation symbol arranged in the array; and responsive to the displayed combination of symbols including both the first EV-adjusting symbol and the activation symbol arranged in the array, modify a mathematical expected value of the casino wagering game for at least one subsequent play of the casino wagering game based on the first EV-adjusting symbol, or responsive to the displayed combination of symbols including both the second EV-adjusting symbol and the activation symbol arranged in the array, modify the mathematical expected value of the casino wagering game for at least one subsequent play of the casino wagering game based on the second EV-adjusting symbol, wherein the first EV-adjusting symbol provides an EV-increasing opportunity that operates, when activated, to thereby increase the mathematical expected value of the casino wagering game, and wherein the second EV-adjusting symbol provides an EV-decreasing opportunity that operates, when activated, to eliminate the EV-increasing opportunity to thereby decrease the mathematical expected value of the casino wagering game.

2. The gaming system of claim 1, wherein first EV-adjusting symbol provides an EV-increasing opportunity that operates, when activated, to increase the mathematical expected value of the casino wagering game for the at least one subsequent play thereof.

3. The gaming system of claim 2, wherein the EV-increasing opportunity, when activated, modifies a first parameter of the casino wagering game to increase the mathematical expected value of the casino wagering game for the at least one subsequent play thereof.

4. The gaming system of claim 1, wherein the modifying the mathematical expected value of the casino wagering game is further responsive to the displayed combination of symbols including the first EV-adjusting symbol arranged in a first predefined symbol location in the array and the activation symbol arranged in a second predefined symbol location in the array.

5. The gaming system of claim 1, wherein the second EV-adjusting symbol provides an EV-decreasing opportunity that operates, when activated, to decrease the mathematical expected value of the casino wagering game for at least one subsequent play thereof.

6. The gaming system of claim 1, wherein the modifying the mathematical expected value of the casino wagering game is further responsive to the displayed combination of symbols including both: (1) the first EV-adjusting symbol or the second EV-adjusting symbol arranged in a first predefined symbol location in the array, and (2) the activation symbol arranged in a second predefined symbol location in the array distinct from the first predefined symbol location.

7. The gaming system of claim 1, wherein the game-logic circuitry is further configured to:

determine if the displayed combination of symbols includes at least one of a plurality of EV-increasing symbols and the activation symbol arranged in the array; and responsive to the displayed combination of symbols including at least one of the EV-increasing symbols and the activation symbol arranged in the array, increase the mathematical expected value of the casino wagering game for at least one subsequent play of the casino wagering game based on the third EV-adjusting symbol.

8. The gaming system of claim 7, wherein the game-logic circuitry is further configured to increase the mathematical expected value of the casino wagering game multiple times in response to multiple displayed combinations of symbols including at least one of the EV-increasing symbols and the activation symbol arranged in the array.

9. A casino gaming machine primarily dedicated to conducting at least one casino wagering game, the gaming machine comprising:

a gaming cabinet configured to house electronic components;

an electronic display device coupled to the gaming cabinet and configured to display aspects of the casino wagering game;

an electronic input device coupled to the gaming cabinet, configured to receive a physical input from a player to initiate the casino wagering game, and further configured to transform the physical input into an electronic data signal; and game-logic circuitry disposed within the gaming cabinet, the game-logic circuitry including a random element generator configured to generate one or more random elements associated with play of the casino wagering game, the game-logic circuitry being configured to:

initiate the casino wagering game in response to the electronic data signal generated by the electronic input device responsive to the physical input from the player;

determine an outcome of the casino wagering game based, at least in part, on the one or more random elements generated by the random element generator;

direct the electronic display device to display in a symbol array a combination of symbols indicative of the outcome of the casino wagering game;

determine if the displayed combination of symbols includes both a first expected value (EV) adjusting symbol and an activation symbol arranged in the array;

determine if the displayed combination of symbols includes both a second EV-adjusting symbol and the activation symbol arranged in the array; and responsive to the displayed combination of symbols including both the first EV-adjusting symbol and the activation symbol arranged in the array, modify a mathematical expected value of the casino wagering game for at least one subsequent play of the casino wagering game based on the first EV-adjusting symbol and, responsive to the displayed combination of symbols including both the second EV-adjusting symbol and the activation symbol arranged in the array, modify the mathematical expected value of the casino wagering game for at least one subsequent play of the casino wagering game based on the second EV adjusting symbol, wherein the second EV-adjusting symbol provides an EV-decreasing opportunity that operates, when activated, to modify a second parameter of the casino wagering game and thereby decrease the mathematical expected value of the casino wagering game for the at least one subsequent play thereof.

10. The casino gaming machine of claim 9, wherein the first EV-adjusting symbol provides an EV-increasing opportunity that operates, when activated, to modify a first parameter of the casino wagering game and thereby increase the mathematical expected value of the casino wagering game for the at least one subsequent play thereof.

11. The casino gaming machine of claim 9, wherein the modifying the mathematical expected value of the casino wagering game is further responsive to the displayed combination of symbols including the first EV-adjusting symbol arranged in a first predefined symbol location in the array and the activation symbol arranged in a second predefined symbol location in the array.

12. The casino gaming machine of claim 9, wherein the modifying the mathematical expected value of the casino wagering game is further responsive to the displayed combination of symbols including both: (1) the first EV-adjusting symbol or the second EV-adjusting symbol arranged in a first predefined symbol location in the array, and (2) the activation symbol arranged in a second predefined symbol location in the array distinct from the first predefined symbol location.

13. The casino gaming machine of claim 9, wherein the first EV-adjusting symbol provides an EV-increasing opportunity that operates, when activated, to thereby increase the mathematical expected value of the casino wagering game, and wherein the second EV-adjusting symbol provides an EV-decreasing opportunity that operates, when activated, to eliminate the EV-increasing opportunity to thereby decrease the mathematical expected value of the casino wagering game.

14. A method of operating a gaming system primarily dedicated to playing at least one regulated casino wagering game, the gaming system including a random element generator, game-logic circuitry, and an electronic gaming machine, the electronic gaming machine including a gaming cabinet, an electronic display device mounted on the gaming cabinet, and an electronic input device mounted on the gaming cabinet, the method comprising:

receiving, from the electronic input device of the electronic gaming machine, an electronic data signal indicating receipt of a physical input from a player as an indication of a wager to initiate the casino wagering game;

generating, in response to the electronic data signal, one or more random elements with the electronic random element generator;

determining, by the game-logic circuitry, an outcome of the casino wagering game based, at least in part, on the one or more random elements;

displaying, in a symbol array on the electronic display device, a combination of symbols indicative of the outcome of the casino wagering game;

determining if the displayed combination of symbols includes both a first expected value (EV) adjusting symbol in a first predefined symbol location in the array and an activation symbol arranged in a second predefined symbol location in the array;

determining if the displayed combination of symbols includes both a second expected value (EV) adjusting symbol in the first predefined symbol location in the array and the activation symbol arranged in the second predefined symbol location in the array; and responsive to the displayed combination of symbols including both the first EV-adjusting symbol in the first predefined symbol location and the activation symbol in the second predefined symbol location, modifying a mathematical expected value of the casino wagering game for at least one subsequent play of the casino wagering game based on the first EV-adjusting symbol and, responsive to the displayed combination of symbols including both the second EV-adjusting symbol in the first predefined symbol location and the activation symbol in the second predefined symbol location, modifying a mathematical expected value of the casino wagering game for at least one subsequent play of the casino wagering game based on the second EV-adjusting symbol;

wherein the second EV-adjusting symbol provides an EV-decreasing opportunity that operates, when activated, to decrease the mathematical expected value of the casino wagering game for at least one subsequent play thereof.

* * * * *